United States Patent
Liu et al.

(10) Patent No.: US 11,997,677 B2
(45) Date of Patent: May 28, 2024

(54) TECHNIQUES FOR SIDELINK JOINT CHANNEL SENSING AND RESOURCE SELECTION

(71) Applicant: QUALCOMM Incorporated, San Diego, CA (US)

(72) Inventors: Chih-Hao Liu, San Diego, CA (US); Jing Sun, San Diego, CA (US); Yisheng Xue, San Diego, CA (US); Xiaoxia Zhang, San Diego, CA (US); Xiaojie Wang, Hillsborough, NJ (US); Sony Akkarakaran, Poway, CA (US); Ozcan Ozturk, San Diego, CA (US); Piyush Gupta, Bridgewater, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 17/497,865

(22) Filed: Oct. 8, 2021

(65) Prior Publication Data
US 2023/0111530 A1 Apr. 13, 2023

(51) Int. Cl.
*H04W 72/20* (2023.01)
*H04B 17/318* (2015.01)
*H04W 72/044* (2023.01)
*H04W 74/0816* (2024.01)

(52) U.S. Cl.
CPC .......... *H04W 72/20* (2023.01); *H04B 17/318* (2015.01); *H04W 72/044* (2013.01); *H04W 74/0816* (2013.01)

(58) Field of Classification Search
CPC .......... H04W 74/0816; H04W 72/044; H04W 72/20; H04B 17/318
See application file for complete search history.

(56) References Cited

U.S. PATENT DOCUMENTS

| | | | |
|---|---|---|---|
| 2020/0029340 A1 | 1/2020 | He et al. | |
| 2020/0100215 A1* | 3/2020 | Li | H04W 74/0808 |
| 2020/0275458 A1* | 8/2020 | Khoryaev | H04W 92/18 |
| 2021/0105104 A1 | 4/2021 | Cao et al. | |

OTHER PUBLICATIONS

International Search Report and Written Opinion - PCT/US2022/043024—ISA/EPO—dated Jan. 9, 2023 (2107042WO).

* cited by examiner

*Primary Examiner* — Kevin M Cunningham
(74) *Attorney, Agent, or Firm* — Holland & Hart LLP

(57) ABSTRACT

Methods, systems, and devices for wireless communications are described. A user equipment (UE) may monitor a first control resource pool associated with sidelink control signaling during a first sensing window and monitor a portion of a second resource pool associated with sidelink data signaling during a second sensing window. The UE may perform joint resource selection on the first resource pool and the second resource pool based on the monitoring during the first and second sensing windows. The UE may transmit a sidelink control information message including resource indication fields to reserve the selected sidelink control channel resources and selected sidelink shared channel resources. The UE may transmit the sidelink data message on one or more of the reserved sidelink shared channel resources.

30 Claims, 12 Drawing Sheets

TECHNIQUES FOR SIDELINK JOINT CHANNEL SENSING AND RESOURCE SELECTION

FIELD OF TECHNOLOGY

The present disclosure relates to wireless communications, including techniques for sidelink joint channel sensing and resource selection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In a wireless communications system implementing sidelink communications, a UE may send sidelink control information (SCI) to schedule sidelink shared channel resources for a sidelink data transmission. In some cases, two UEs may reserve a same sidelink shared channel resource, which may result in colliding sidelink transmissions. Collision on sidelink shared channel resources may lead to delays and significant overhead to reschedule the sidelink shared channel transmissions.

SUMMARY

The described techniques relate to improved methods, systems, devices, and apparatuses that support techniques for sidelink joint channel sensing and resource selection. Generally, the described techniques provide for selecting sidelink control channel resources and sidelink shared channel resources in a decoupled resource pool configuration. Some wireless communications systems may support cross-carrier scheduling for sidelink communications using decoupled resource pools, where sidelink control information (SCI) transmitted in a control resource pool schedules sidelink data transmissions in a sidelink data resource pool. A user equipment (UE) may perform joint channel sensing on the sidelink control resource pool and the sidelink data resource pool to perform joint resource selection on the sidelink control resource pool and the sidelink data resource pool. For example, the UE may monitor a first sensing window in the control resource pool and a second sensing window in a portion of the data resource pool which overlaps a legacy data resource pool. The UE may perform the channel sensing to identify available candidate resources in the sidelink control resource pool and the sidelink data resource pool. The UE may select sidelink control channel resources from identified available resources in the control resource pool within a first resource selection window, and the transmitting UE may select sidelink shared channel resources from identified available resources in the data resource pool within a second resource selection window. The UE may transmit an SCI in the control resource pool to reserve the selected resources. In some cases, the SCI may include a first set of resource allocation fields to indicate reservations from the sidelink control resource pool and a second set of resource allocation fields to indicate reservations from the sidelink shared channel resource pool.

A method for wireless communications at a UE is described. The method may include monitoring, during a first sensing window, a first resource pool associated with sidelink control signaling, selecting one or more sidelink control channel resources from the first resource pool based on the monitoring during the first sensing window, monitoring, during a second sensing window, at least a portion of a second resource pool associated with sidelink data signaling, selecting one or more sidelink shared channel resources from the second resource pool based on the monitoring during the first sensing window and the monitoring during the second sensing window, transmitting, on a first sidelink control channel resource from the first resource pool, a first SCI message reserving the selected one or more sidelink control channel resources from the first resource pool and reserving the selected one or more sidelink shared channel resources from the second resource pool for a sidelink data message, and transmitting the sidelink data message on the one or more reserved sidelink shared channel resources.

An apparatus for wireless communications at a UE is described. The apparatus may include a processor, memory coupled with the processor, and instructions stored in the memory. The instructions may be executable by the processor to cause the apparatus to monitor, during a first sensing window, a first resource pool associated with sidelink control signaling, select one or more sidelink control channel resources from the first resource pool based on the monitoring during the first sensing window, monitor, during a second sensing window, at least a portion of a second resource pool associated with sidelink data signaling, select one or more sidelink shared channel resources from the second resource pool based on the monitoring during the first sensing window and the monitoring during the second sensing window, transmit, on a first sidelink control channel resource from the first resource pool, a first SCI message reserving the selected one or more sidelink control channel resources from the first resource pool and reserving the selected one or more sidelink shared channel resources from the second resource pool for a sidelink data message, and transmit the sidelink data message on the one or more reserved sidelink shared channel resources.

Another apparatus for wireless communications at a UE is described. The apparatus may include means for monitoring, during a first sensing window, a first resource pool associated with sidelink control signaling, means for selecting one or more sidelink control channel resources from the first resource pool based on the monitoring during the first sensing window, means for monitoring, during a second sensing window, at least a portion of a second resource pool associated with sidelink data signaling, means for selecting one or more sidelink shared channel resources from the second resource pool based on the monitoring during the first sensing window and the monitoring during the second sensing window, means for transmitting, on a first sidelink control channel resource from the first resource pool, a first SCI message reserving the selected one or more sidelink control channel resources from the first resource pool and reserving the selected one or more sidelink shared channel resources from the second resource pool for a sidelink data message, and means for transmitting the sidelink data message on the one or more reserved sidelink shared channel resources.

A non-transitory computer-readable medium storing code for wireless communications at a UE is described. The code may include instructions executable by a processor to monitor, during a first sensing window, a first resource pool associated with sidelink control signaling, select one or more sidelink control channel resources from the first resource pool based on the monitoring during the first sensing window, monitor, during a second sensing window, at least a portion of a second resource pool associated with sidelink data signaling, select one or more sidelink shared channel resources from the second resource pool based on the monitoring during the first sensing window and the monitoring during the second sensing window, transmit, on a first sidelink control channel resource from the first resource pool, a first SCI message reserving the selected one or more sidelink control channel resources from the first resource pool and reserving the selected one or more sidelink shared channel resources from the second resource pool for a sidelink data message, and transmit the sidelink data message on the one or more reserved sidelink shared channel resources.

In some examples of the method, apparatuses, and non-transitory computer-readable medium described herein, transmitting the first SCI message may include operations, features, means, or instructions for transmitting the first SCI message including a first time domain resource allocation field and a first frequency domain resource allocation field indicating the one or more sidelink control channel resources and including a second time domain resource allocation field and a second frequency domain resource allocation field indicating the one or more sidelink shared channel resources.

In some examples of the method, apparatuses, and non-transitory computer-readable medium described herein, the selecting may include operations, features, means, or instructions for selecting the one or more sidelink control channel resources from the first resource pool according to a first resource selection window from the first sidelink control channel resource and selecting the one or more sidelink shared channel resources from the second resource pool according to a second resource selection window from the first sidelink control channel resource.

In some examples of the method, apparatuses, and non-transitory computer-readable medium described herein, the first resource selection window may be associated with a first starting time and a first duration, and the second resource selection window may be associated with a second starting time and a second duration.

In some examples of the method, apparatuses, and non-transitory computer-readable medium described herein, transmitting the first SCI message may include operations, features, means, or instructions for transmitting the first SCI message on a subchannel that may be mapped to a slot of the second resource pool, where the first SCI message reserves a first sidelink shared channel resource of the one or more sidelink shared channel resources in the slot based on the subchannel being mapped.

Some examples of the method, apparatuses, and non-transitory computer-readable medium described herein may further include operations, features, means, or instructions for indicating, via a frequency domain resource allocation field of the first SCI message, a subchannel of the slot of the second resource pool for the first sidelink shared channel resource.

In some examples of the method, apparatuses, and non-transitory computer-readable medium described herein, monitoring the first resource pool during the first sensing window may include operations, features, means, or instructions for detecting, on the first resource pool during the first sensing window, a second SCI message reserving a second sidelink control channel resource and a second sidelink shared channel resource, selecting the one or more sidelink control channel resources which do not overlap with the second sidelink control channel resource, and selecting the one or more sidelink shared channel resources which do not overlap with the second sidelink shared channel resource.

In some examples of the method, apparatuses, and non-transitory computer-readable medium described herein, monitoring the second resource pool during the second sensing window may include operations, features, means, or instructions for detecting, on the second resource pool during the second sensing window, a second SCI message reserving a second sidelink shared channel resource and selecting the one or more sidelink shared channel resources which do not overlap with the second sidelink shared channel resource.

Some examples of the method, apparatuses, and non-transitory computer-readable medium described herein may further include operations, features, means, or instructions for transmitting a second SCI message on the portion of the second resource pool that may be at least partially overlapping a third resource pool, where the second SCI message indicates the one or more sidelink shared channel resources in the portion of the second resource pool that may be at least partially overlapping the third resource pool.

Some examples of the method, apparatuses, and non-transitory computer-readable medium described herein may further include operations, features, means, or instructions for estimating a first reference signal received power (RSRP) projection on the first resource pool based at least in part monitoring the first resource pool during the first sensing window, where the one or more sidelink control channel resources may be selected based on the first RSRP projection and estimating a second RSRP projection on the second resource pool based at least in part monitoring the first resource pool and monitoring the second resource pool, where the one or more sidelink shared channel resources may be selected based on the second RSRP projection.

In some examples of the method, apparatuses, and non-transitory computer-readable medium described herein, the selecting may include operations, features, means, or instructions for selecting the one or more sidelink control channel resources based on the first RSRP projection for the one or more sidelink control channel resources satisfying a first threshold and selecting the one or more sidelink shared channel resources based on the second RSRP projection for the one or more sidelink shared channel resources satisfying a second threshold.

In some examples of the method, apparatuses, and non-transitory computer-readable medium described herein, the one or more sidelink shared channel resources may be offset in time from the one or more sidelink control channel resources by a configured number of slots.

In some examples of the method, apparatuses, and non-transitory computer-readable medium described herein, the configured number of slots may be based on a capability of the UE.

In some examples of the method, apparatuses, and non-transitory computer-readable medium described herein, the first threshold may be based on a first priority of signaling associated with the one or more sidelink control channel resources or a first resource candidate availability in the first resource pool, or both, and the second threshold may be based on a second priority of signaling associated with the one or more sidelink shared channel resources or a second resource candidate availability in the second resource pool, or both.

In some examples of the method, apparatuses, and non-transitory computer-readable medium described herein, the one or more sidelink control channel resources may be selected randomly.

In some examples of the method, apparatuses, and non-transitory computer-readable medium described herein, the one or more sidelink shared channel resources may be selected based on channel state information for the second resource pool.

Some examples of the method, apparatuses, and non-transitory computer-readable medium described herein may further include operations, features, means, or instructions for selecting the one or more sidelink shared channel resources based on a highest RSRP projection from the first RSRP projection and the second RSRP projection.

Some examples of the method, apparatuses, and non-transitory computer-readable medium described herein may further include operations, features, means, or instructions for selecting the one or more sidelink shared channel resources based on a sum of the first RSRP projection and the second RSRP projection.

Some examples of the method, apparatuses, and non-transitory computer-readable medium described herein may further include operations, features, means, or instructions for determining the first sidelink control channel resource may be available prior to transmission, where the first SCI message may be transmitted based at least in part the first sidelink control channel resource being available and determining the one or more sidelink shared channel resources may be available prior to transmission, where the sidelink data message may be transmitted based at least in part the one or more sidelink shared channel resources being available.

A method for wireless communications at a UE is described. The method may include receiving, on a sidelink control channel resource of a first resource pool, a SCI message including a first set of resource allocation fields reserving one or more sidelink control channel resources and a second set of resource allocation fields reserving one or more sidelink shared channel resources in a second resource pool for a sidelink data message and receiving the sidelink data message on the one or more sidelink shared channel resources in the second resource pool based on receiving the SCI message.

An apparatus for wireless communications at a UE is described. The apparatus may include a processor, memory coupled with the processor, and instructions stored in the memory. The instructions may be executable by the processor to cause the apparatus to receive, on a sidelink control channel resource of a first resource pool, a SCI message including a first set of resource allocation fields reserving one or more sidelink control channel resources and a second set of resource allocation fields reserving one or more sidelink shared channel resources in a second resource pool for a sidelink data message and receive the sidelink data message on the one or more sidelink shared channel resources in the second resource pool based on receiving the SCI message.

Another apparatus for wireless communications at a UE is described. The apparatus may include means for receiving, on a sidelink control channel resource of a first resource pool, a SCI message including a first set of resource allocation fields reserving one or more sidelink control channel resources and a second set of resource allocation fields reserving one or more sidelink shared channel resources in a second resource pool for a sidelink data message and means for receiving the sidelink data message on the one or more sidelink shared channel resources in the second resource pool based on receiving the SCI message.

A non-transitory computer-readable medium storing code for wireless communications at a UE is described. The code may include instructions executable by a processor to receive, on a sidelink control channel resource of a first resource pool, a SCI message including a first set of resource allocation fields reserving one or more sidelink control channel resources and a second set of resource allocation fields reserving one or more sidelink shared channel resources in a second resource pool for a sidelink data message and receive the sidelink data message on the one or more sidelink shared channel resources in the second resource pool based on receiving the SCI message.

In some examples of the method, apparatuses, and non-transitory computer-readable medium described herein, receiving the SCI message may include operations, features, means, or instructions for receiving the SCI message including a first time domain resource allocation field and a first frequency domain resource allocation field indicating the one or more sidelink control channel resources and including a second time domain resource allocation field and a second frequency domain resource allocation field indicating the one or more sidelink shared channel resources.

Some examples of the method, apparatuses, and non-transitory computer-readable medium described herein may further include operations, features, means, or instructions for monitoring the one or more sidelink control channel resources in the first resource pool for a retransmission of the SCI message based on the first set of resource allocation fields.

DETAILED DESCRIPTION

Figure 1:
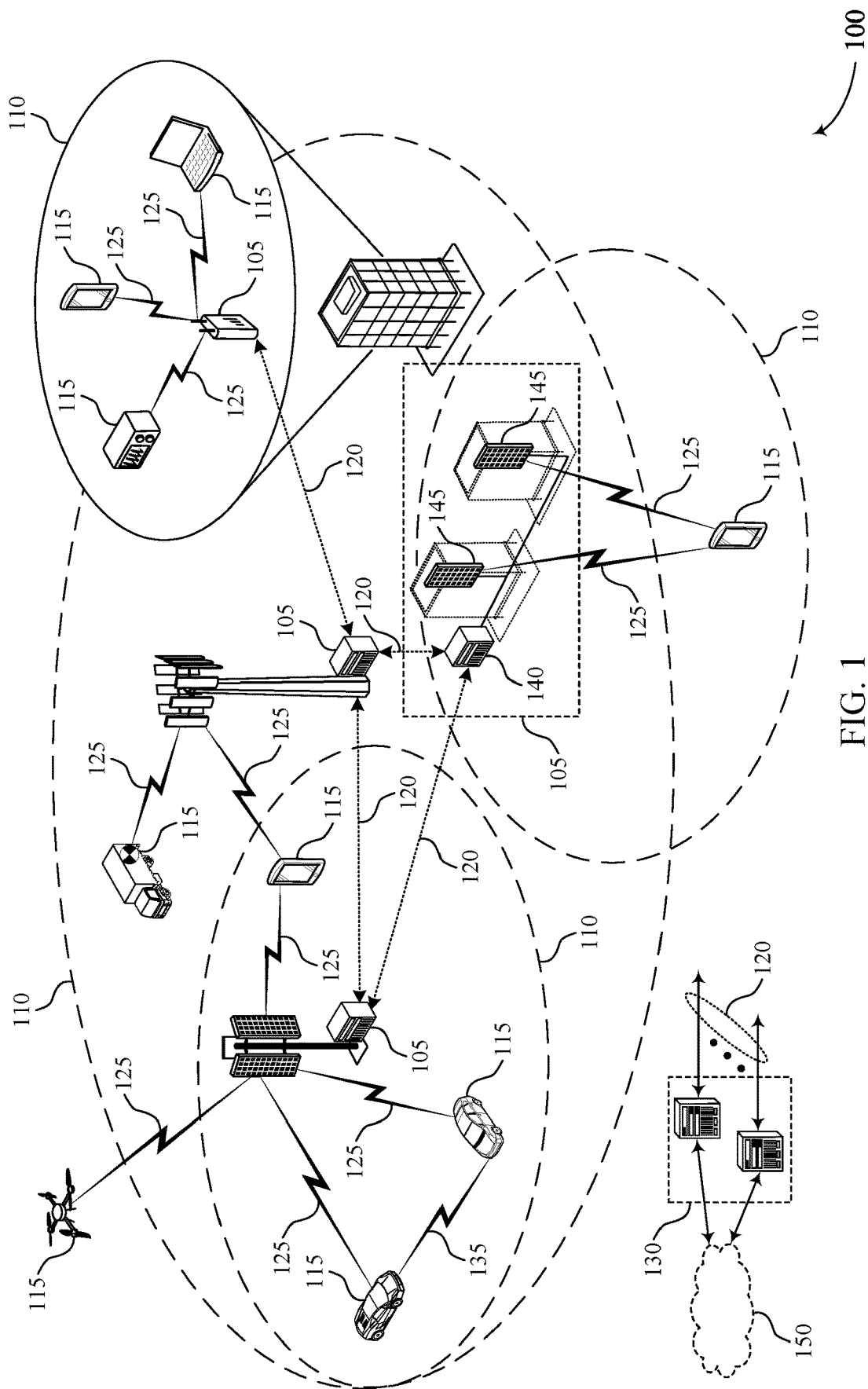
FIG. 1 illustrates an example of a wireless communications system that supports techniques for sidelink joint channel sensing and resource selection in accordance with aspects of the present disclosure.

In a wireless communications system supporting sidelink communications, a user equipment (UE) may transmit sidelink control information (SCI) to schedule resources for a sidelink data message on sidelink shared channel resources. Some systems may support cross-carrier scheduling for sidelink communications, where SCI transmitted in a first radio frequency spectrum band schedules sidelink data transmissions in a second radio frequency spectrum band. For example, SCI in a 6 gigahertz bandwidth may schedule a sidelink data message in a higher, millimeter wave bandwidth. Some of these systems may utilize decoupled control and data resource pools, where a mini-slot control resource pool is in a low radio frequency spectrum band, and a data resource pool is in a high radio frequency spectrum band. However, there may be significant delay if a collision occurs on the sidelink shared channel resources. In some cases, the data resource pool may at least partially overlap with a legacy sidelink data resource pool. While devices which are capable of decoupled resource pools may avoid resource collisions using the dedicated control resource pool, scheduling collisions may still occur with legacy UE devices using the legacy sidelink data resource pool.

The present disclosure provides techniques for joint channel sensing on both a sidelink control resource pool and a sidelink data resource pool. For example, a transmitting UE may monitor a first sensing window in the control resource pool and a second sensing window in a portion of the data resource pool which overlaps the legacy data resource pool. For example, the transmitting UE may detect an SCI from a second UE in the control resource pool reserving resources in the control resource pool and the data resource pool, and the transmitting UE may select resources which do not overlap with the resources reserved by the second UE. Similarly, the transmitting UE may detect an SCI from a third UE (e.g., a legacy UE) in the data resource pool to reserve resources in the overlapping portion of the data resource pool, and the transmitting UE may select resources which do not overlap with already reserved resources. In some cases, the transmitting UE may select resources from the control resource pool within a first resource selection window, and the transmitting UE may select resources from the data resource pool within a second resource selection window.

After monitoring the resource pools and identifying available candidate resources, the transmitting UE may transmit an SCI in the control resource pool to reserve the selected sidelink control channel resources in the control resource pool and the selected sidelink shared channel resources in the data resource pool. In some cases, the SCI may include a first set of resource allocation fields to indicate reservations from the sidelink control resource pool and a second set of resource allocation fields to indicate reservations from the sidelink shared channel resource pool. In some cases, subchannels in the control resource pool may be mapped to different slots in the data resource pool, which may avoid resource reservation collisions if two UEs have a half-duplex constraint and are unable to listen to other SCI while transmitting. Additional techniques are described herein to provide flexible scheduling for a decoupled control and resource pool configuration while avoiding collision.

Aspects of the disclosure are initially described in the context of wireless communications systems. Aspects of the disclosure are further illustrated by and described with reference to apparatus diagrams, system diagrams, and flowcharts that relate to techniques for sidelink joint channel sensing and resource selection.

FIG. 1 illustrates an example of a wireless communications system 100 that supports techniques for sidelink joint channel sensing and resource selection in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support sidelink communications. For example, sidelink communications may include signaling between two or more UEs 115 over sidelink channels, such as a physical sidelink control channel (PSCCH), a physical sidelink shared channel (PSSCH), a physical layer feedback channel (PSFCH), and the like. In some cases, a UE 115 may transmit SCI to reserve resources. For example, the UE 115 may transmit a first-stage SCI (e.g., SCI-1) to reserve a sidelink shared channel resource, and the first-stage SCI may reserve resources for up to three retransmissions in a periodic pattern. The pattern may be indicated in the first-stage SCI, indicating either a range of slots or indicating that there is no periodic reservation for the first-stage SCI. The first-stage SCI may be configured (e.g., via RRC signaling) to reserve up to one or two additional slots within a range of the initial first-stage SCI transmission. For example, a first-stage SCI may reserve zero, one, or two additional sidelink control channel resources within 32 slots of the first-stage SCI.

A node configured for sidelink communications (e.g., a UE 115) may be triggered to report available resources to an upper layer. The information may be determined from historic first-stage SCI monitoring by considering the reserved resource and priority of the monitored first-stage SCI. For a monitored first-stage SCI, the node may reserve the resource for up to the next three transmissions (e.g., a current transmission and up to two retransmissions), and up to another three resources in the next instance of the indicated period (e.g., if the periodicity is non-zero). If the node cannot monitor an occasion due to a half-duplex constraint (e.g., the node cannot transmit and receive at the same time), the node may assume a worst case, where a first-stage SCI was transmitted but not detected, and the node may block the slots possibly indicated by all periods configured.

A UE 115 may perform resource sensing in order to select resources for a sidelink transmission. For example, when a resource selection is triggered at time n, the UE 115 may evaluate a sensing window to identify a set of candidate resources in a resource selection window (RSW). For example, by detecting signaling within the sensing window, the UE 115 may determine which resources in the resource selection window are available (e.g., based on a periodicity of the signaling or resource reservation indications of SCI in the sensing window, or both). In some cases, a physical layer at the UE 115 may report the available candidate resources to a MAC layer at the UE 115. The MAC layer may select one resource from the candidate resources for transmission. If the UE 115 selects additional resources for HARQ retransmissions, the resources for multiple PSSCH resources for the same transport block may be selected randomly by the MAC as well.

In some cases, the wireless communications system 100 may support cross-carrier scheduling for sidelink communications, where a UE 115 may transmit SCI in a first radio frequency spectrum band to schedule sidelink data transmissions in a second radio frequency spectrum band. For example, SCI in a 6 gigahertz bandwidth may schedule sidelink data message in a higher, millimeter wave bandwidth. The higher band may have large bandwidth suitable for PSSCH transmissions carrying high throughput data transmissions. In some cases, a UE 115 may transmit SCI-1 as a broadcast, indicating future reservations that other nodes (e.g., other UEs 115) may monitor.

Some of these systems may utilize decoupled control and data resource pools, where a mini-slot control resource pool is in a low radio frequency spectrum band, and a data resource pool is in a high radio frequency spectrum band. A decoupled control resource pool and data resource pool design may provide control and data beam switching and cross-carrier scheduling. SCI-1 transmitted in mini-slots of the control resource pool may reduce the scheduling delay in the low band to match the PSSCH with the high band numerology. In some cases, PSFCH resources may be included in the mini-slot structure and may be time division multiplexed or frequency division multiplexed with shortened PSSCH or shortened PSCCH resources (e.g., mini-slot PSSCH and mini-slot PSCCH resources). The PSFCH resources may be used to send an acknowledgment (ACK) or negative acknowledgment (NACK) for shortened PSSCH based on a mini-slot index and subchannels of the associated shortened PSSCH or an explicit resource index and K1 signaled in the shortened PSSCH scheduling SCI. In some cases, a legacy sidelink node or a legacy UE 115 may refer to a node or a UE 115 which does not support decoupled control and resource pools. In some cases, a new UE 115 or a new sidelink node may refer to a node or a UE 115 which does support decoupled resource pools, among other techniques described herein.

In some systems, there may be significant delay if a collision occurs on the sidelink shared channel resources.

For example, SCI transmitted in the control resource pool may schedule multiple data messages or multiple repetitions of a data message on multiple sidelink shared channel resources. If there is a collision (e.g., another UE 115 transmits on some of the same resources), the transmitter may be supported to reschedule the data message only after transmitting the data message and receiving a negative acknowledgment for the data message. Therefore, in current systems, a transmitting UE 115 may transmit the data message, the message may collide, and the transmitting UE 115 may have to wait to reschedule the data message, which may introduce significant delay and overhead to reschedule the data message.

Some systems may implement a one-to-one mapping from resources in the control resource pool to resources in the data resource pool. A one-to-one mapping may prevent collisions in the data resource pool if there is no collision in the control resource pool. Therefore, mode 2 channel sensing and resource selection may be performed in the control resource pool to prevent collisions. However, a one-to-one mapping may lack scheduling flexibility. For example, the SCI in a certain control resource pool mini-slot may only schedule PSSCH in the corresponding, mapped data subchannel. Even with subchannel SCI, the transmitter may not schedule PSSCH in a best or highest quality subchannel.

Additionally, the interference in the two resource pools may not be the same. For example, a wireless communications system may have a mixed deployment of UEs 115 with different capabilities. The data resource pool may at least partially overlap with a legacy resource pool used by UEs 115 which do not support the decoupled resource pool techniques, and therefore will not detect collisions or indicate reservations via the decoupled control resource pool. Additionally, the anchor control carrier may schedule multiple different data resource pools in multiple different carriers, such that the interference in the control resource pool and the data resource pool may be different. The one-to-one mapping design may not support finding the optimal resource candidate combination in both the control resource pool and the data resource pool.

However, full resource selection flexibility may result in some issues with half-duplex UEs 115. For example, transmitters which are frequency division multiplexed in the control resource pool may not hear each other's future reservations even though they do not collide in the control resource pool. With full resource selection flexibility, two UEs 115 which transmit frequency division multiplexed SCIs may pick overlapping resources in the data resource pool and collide. Because the UEs 115 cannot hear each other's future reservations for retransmission due to the half-duplex constraint, there is a chance that the retransmissions may also collide.

The wireless communications system 100 may support techniques for sidelink joint channel sensing and resource selection to provide flexible resource scheduling in a decoupled resource pool configuration while prevent resource collisions. For example, a UE 115 may monitor both a first sensing window in the control resource pool and a second sensing window in the data resource pool. The UE 115 may select resources for SCI and PSSCH in respective resource selection windows in the control and data resource pools. The UE 115 may transmit a first-stage SCI (e.g., SCI-1) including a first set of resource indication fields to indicate the selected resources in the control resource pool and a second set of resource indication fields to indicate the selected resources in the data resource pool. For example, the first-stage SCI may include a first time domain resource allocation (TDRA) field and a first frequency domain resource allocation (FDRA) field to indicate the selected one or more control channel resources, and the first-stage SCI may include a second TDRA field and a second FDRA field to indicate the selected one or more sidelink shared channel resources.

In some cases, the wireless communications system 100 may implement some aspects of a mapping between the control resource pool and the data resource pol. For example, different control subchannels may map to different data slots, which may prevent some half-duplex scheduling conflicts. For example, UEs 115 which are frequency division multiplexed may schedule PSSCH in different slots for at least the initial transmission. However, via the FDRA field, a UE 115 may still have full flexibility to schedule different subchannels of the slot.

Figure 2:
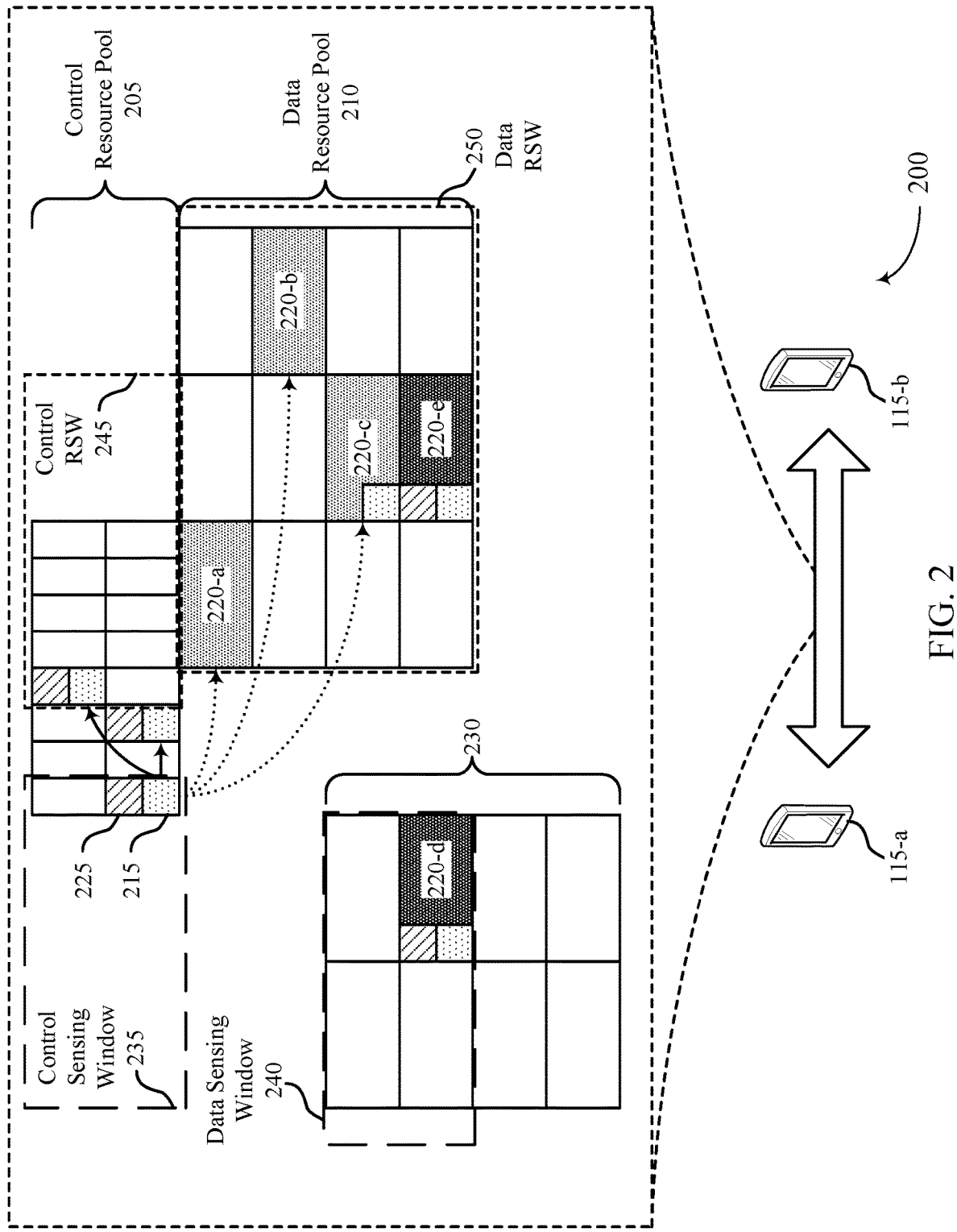
FIG. 2 illustrates an example of a wireless communications system that supports techniques for sidelink joint channel sensing and resource selection in accordance with aspects of the present disclosure.

FIG. 2 illustrates an example of a wireless communications system 200 that supports techniques for sidelink joint channel sensing and resource selection in accordance with aspects of the present disclosure. The wireless communications system 200 may include a UE 115-a and a UE 115-b, which may each be an example of a UE 115 as described with reference to FIG. 1.

The wireless communications system 200 may support sidelink communications using decoupled control and data resource pools. For example, UEs 115 may communicate control signaling in a control resource pool 205 and data signaling in a data resource pool 210. In some cases, the control resource pool 205 may be in 6 GHz or sub-6 GHz radio frequency spectrum band, and the data resource pool 210 may be in a mmW radio frequency spectrum band.

UEs 115 may communicate SCI on resources in the control resource pool 205. For example, a transmitting UE 115 may transmit a first-stage SCI on sidelink control channel resources 215 in the control resource pool 205, and receiving UEs 115 may monitor the control resource pool 205 for SCI from transmitting UEs 115. The first-stage SCI may schedule sidelink shared channel resources 220 in the data resource pool for a sidelink data transmission.

In some cases, the control resource pool 205 may be configured according to a mini-slot structure. For example, there may be a number of mini-slots per slot in the control resource pool 205. Each mini-slot may include one or more subchannels in the control resource pool 205. In some cases, a first-stage SCI may be transmitted on sidelink control channel resources 215 which spans a mini-slot in the control resource pool 205. In some cases, the mini-slot structure may reduce a scheduling delay when scheduling sidelink shared channel resources 220 in the higher band with a higher band numerology.

The control resource pool 205 may include sidelink control channel resources or sidelink shared channel resources, or both. For example, a UE 115 may transmit a first-stage SCI on a sidelink control channel resource 215 and transmit a second-stage SCI on a sidelink shared channel resource 225 (e.g., a shortened sidelink shared channel resources which span a mini-slot) in the control resource pool 205. In some cases, a first-stage SCI may include a Layer 1 source identifier corresponding to the transmitting UE 115. A Layer 1 destination identifier may be included in a first-stage SCI or a second-stage SCI, or both. In some cases, a second-stage SCI may include a transmission configuration indicator (TCI) state field for PSSCH and one or more CSI triggering state fields for CSI-RS.

In some cases, the data resource pool 210 may at least partially overlap with a legacy resource pool 230. The legacy resource pool 230 may be used by legacy UEs 115.

In some cases, a legacy UE 115 may not support, or may not be configured to support, the decoupled resource pool configuration. Therefore, a legacy UE 115 may not receive or transmit using the control resource pool 205. The legacy UE 115 may transmit both SCI-1, SCI-2, and sidelink data on resources from the legacy resource pool 230. Due to the overlap, monitoring just the control resource pool 205 to detect collisions in the data resource pool 210 may still lead to collisions in the data resource pool 210 with legacy UEs 115.

The wireless communications system 200 may support techniques for sidelink joint channel sensing and resource selection, which may provide resource selection flexibility while avoiding resource selection collision. These techniques may prevent resource collisions between two UEs 115 using the decoupled resource pools as well as preventing resource collisions with a legacy UE 115 using the legacy resource pool 230. For example, the UE 115-a may perform joint channel sensing and joint resource selection to select sidelink control channel resources 215 in the control resource pool 205 and select sidelink shared channel resources 220 in the data resource pool 210 to transmit a sidelink data message to the UE 115-b.

For example, the UE 115-a may perform joint channel sensing on the control resource pool 205 and the data resource pool 210. Specifically, the wireless communications system may support a control sensing window 235 for the control resource pool 205 and a data sensing window 240 for a portion of the data resource pool 210 which overlaps the legacy resource pool 230. The control sensing window 235 may be used to detect SCI-1 from sidelink nodes which are configured for the decoupled resource pools.

The data sensing window 240 may be used for coexistence with legacy sidelink nodes, such as legacy UEs 115. For example, when the legacy resource pool 230 is configured to at least partially overlap with the data resource pool 210, an additional legacy sensing window (e.g., the data sensing window 240) may be configured for the overlapping resources. In an example, the data resource pool 210 may overlap on two subchannels with the legacy resource pool 230. In this example, the data sensing window 240 may span the two overlapping subchannels in the data resource pool. In some cases, the UE 115-a may sense for SCI messages in the overlapping region. The UE 115-a may interpret the SCI-1 messages in the data sensing window 240 according to a legacy resource pool configuration. For example, the UE 115-a may detect a first-stage SCI with the sidelink shared channel resource 220-a in the data sensing window 240, and the UE 115-a may detect that the first-stage SCI with the sidelink shared channel resource 220-a also reserves the sidelink shared channel resource 220-e in the data resource selection window 250.

In some cases, the UE 115-a may only consider resource reservations which are within the data resource pool 210. For example, if the UE 115-a detects an SCI in the data sensing window 240 which reserves a sidelink shared channel resource 220 outside of the data resource pool 210, this reservation may not affect scheduling decisions at the UE 115-a. If the legacy resource pool 230 is configured, the new nodes (e.g., the UE 115-a and the UE 115-b) may not decode legacy SCI-1 messages in a non-overlapping portion of the data resource pool. For example, legacy UEs 115 may not use the non-overlapping portion of the data resource pool 210, so a new node (e.g., the UE 115-a or the UE 115-b, or both) may identify resource reservations from other new nodes from the control resource pool 205.

In some cases, the UE 115-a may send a first-stage SCI to indicate resource reservations in the data resource pool 210 if the legacy resource pool 230 is configured and at least partially overlaps the data resource pool 210. For example, when the UE 115-a transmits a sidelink data message on a sidelink shared channel resource 220-c, the UE 115-a may also send a first-stage SCI in the data resource pool 210, as the sidelink shared channel resource 220-c may be in the overlapping region of the data resource pool 210 and the legacy resource pool 230. UE 115-a may transmit the first-stage SCI in the data resource pool 210 so that legacy UEs 115 can identify the reserved resources and avoid collisions. In some examples, the first-stage SCI transmitted in the overlapping portion of the data resource pool 210 may indicate just resources which are reserved in the overlapping portion of the data resource pool 210. For example, the first-stage SCI transmitted in the data resource pool 210, including TDRA and FDRA fields in this first-stage SCI, may be configured with respect to the legacy resource pool 230.

In some cases, if there is not an overlap between the data resource pool 210 and the legacy resource pool 230, UE 115-a may refrain from transmitting the first-stage SCI in the data resource pool 210. Similarly, in some cases, if the legacy resource pool 230 is not configured, or the legacy resource pool 230 is not configured to overlap with the data resource pool 210, the data sensing window 240 may not be configured. In some other examples, UE 115-a may transmit SCI with sidelink data messages in the data resource pool 210 even if the legacy resource pool 230 is not configured or even if the data resource pool 210 does not overlap the legacy resource pool 230.

In some cases, there may be separate resource selection windows for the control resource pool 205 and the data resource pool. For example, the UE 115-a may select resources from the control resource pool 205 within a control resource selection window 245, and the UE 115-a may select resources from the data resource pool 210 within a data resource selection window 250. Each resource selection window may have a separate starting time and duration. For example, the control resource selection window 245 and the data resource selection window 250 may have different starting times (e.g., $T_1$ and $T_2$ respectively) from a resource selection trigger at the UE 115-a. Similarly, the resource selection windows may span different amounts of time, such as a different number of slots or mini-slots. In some examples, the resource selection windows may have the same duration or starting times, or both.

The UE 115-a may perform joint resource selection in the resource selection windows based on the joint channel sensing. For example, based on first-stage SCI messages detected in one or more sensing windows (e.g., the control sensing window 235 or the data sensing window 240, or both), the UE 115-a may compute projected reference signal received power (RSRP) measurements and determine candidate resources in both the control resource pool 205 and the data resource pool 210. Resources from the RSRP projections which are above the RSRP threshold may be identified, or marked, as unavailable. Resources from the RSRP projections which are below the RSRP threshold may be identified as available candidate resources. For example, the UE 115-a may identify a set of available candidate sidelink control channel resources within the control resource selection window 245 and identify a set of available candidate sidelink shared channel resources within the data resource selection window 250.

In some cases, the control resource pool 205 and the data resource pool 210 may have different RSRP thresholds. For example, for each resource pool and each priority, a transmitting UE 115, such as the UE 115-a, may have a corresponding RSRP threshold to determine resource candidates. For example, for a same priority signaling, the UE 115-a may use a different RSRP threshold for the control resource pool 205 and the data resource pool 210 to determine whether a resource is available. Similarly, the UE 115-a may use a first RSRP threshold to identify candidate resources for signaling of a first priority in the data resource pool 210 and use a second RSRP threshold to identify candidate resources for signaling of a second priority in the data resource pool 210. In some cases, the RSRP thresholds may be based on a channel occupancy or channel availability. For example, the UE 115-a may increase the RSRP threshold for a resource pool if a number of available resources in the resource pool is below a threshold (e.g., a threshold percentage of total resources).

In a mixed deployment with legacy nodes (e.g., legacy UEs 115), a new node (e.g., the UE 115-a) may determine an RSRP projection from multiple sensing windows. In some cases, the UE 115-a may combine the projected RSRPs from all available sensing windows in the overlapping region of the data resource pool 210. For example, the UE 115-a may combine the projected RSRP from the control sensing window 235 and the data sensing window 240 in the part of the data resource pool 210 which overlaps the legacy resource pool 230. In a first example, the UE 115-a may take a maximum of the projected RSRPs from the different sensing windows for a given resource in the data resource pool 210. The projected RSRP from the control sensing window 235 may capture possible interference or collisions with new sidelink nodes, and the projected RSRP from the data sensing window 240 may capture possible interference or collisions with legacy sidelink nodes and new sidelink nodes. In a second example, the UE 115-a may take the sum of the RSRP projections from the multiple sensing windows for a given resource in the data resource pool 210. If a first-stage SCI has a new node indication, the UE 115-a may have the data sensing window 240 project RSRP from just legacy nodes. Taking the sum of RSRP projections may provide the total interference from both legacy nodes and new nodes for a given resource.

The UE 115-a may select resources from the set of available candidate sidelink control channel resources and from the set of available candidate sidelink shared channel resources. In some cases, the UE 115-a may randomly select the sidelink control channel resources 215 from the set of available candidates in the control resource selection window 245.

The UE 115-a may select time domain resources for the sidelink shared channel resources 220 based on a mapping between subchannels in the control resource pool 205 and slots in the data resource pool 210. For example, a first subchannel in the control resource pool 205 may map to a first slot in the data resource pool 210, while a second subchannel in the control resource pool 205 may map to a second, different slot in the data resource pool 210. In some cases, a sidelink shared channel resource 220 may be offset from a corresponding sidelink control channel resource 215 by at least a number of slots, NO, which may be based on a UE capability. The UE 115-a may select frequency resources for the sidelink shared channel resources 220 either randomly or based on CSI.

The UE 115-a may select resources to avoid resource collision in both resource pools. For example, the UE 115-a may select resources only from the available candidate resources, and the UE 115-a may avoid selecting a resource if there is a possible collision on the resource. For example, the UE 115-a may select a sidelink shared channel resource 220-a, a sidelink shared channel resource 220-b, and a sidelink shared channel resource 220-c, as these resources may be identified as available (e.g., RSRP projections below a threshold). The slots for the shared channel resources 220 may be based on subchannels of corresponding reserved sidelink control channel resources 215, while the subchannels of the sidelink shared channel resources 220 may be randomly selected or selected based on CSI to reserve resources with high channel quality or low interference.

In some cases, a UE 115 may perform a last-minute evaluation to determine there is no collision prior to transmission. For example, the UE 115-a may perform a last minute evaluation before transmitting a fist-stage SCI in the control resource pool 205 to check resource availability in both of the resource selection windows. If any of the chosen candidates in the control resource pool 205 or the data resource pool 210 are not available, the UE 115-a may re-select resources.

The UE 115-a may transmit a first-stage SCI on the sidelink control channel resource 215. The first-stage SCI may include a first set of resource indication fields for resource reservations from the control resource pool 205 and a second set of resource indication fields for resource reservations from the data resource pool 210. For example, the first-stage SCI may include a first TDRA and a first FDRA to indicate resources for SCI in the control resource pool 205 and a second TDRA and a second FDRA to indicate resources for PSSCH in the data resource pool 210. The first-stage SCI may reserve up to two future mini-slots and control subchannels for SCI retransmission in the control resource pool 205. The first-stage SCI may also reserve PSSCH resources for the initial sidelink data transmission and up to two future transmissions in the data resource pool 210. For example, the UE 115-a may reserve the sidelink shared channel resource 220-a for the initial sidelink data transmission as well as the sidelink shared channel resource 220-b and the sidelink shared channel resource 220-c for future transmissions.

By implementing these techniques, the UE 115-a may transmit a data message to the UE 115-a using a decoupled resource pool configuration while avoiding reservation collisions. Additionally, these techniques may provide some scheduling flexibility, such that the UE 115-a may select frequency domain resources for the sidelink data transmission which may provide higher signal quality.

Figure 3:
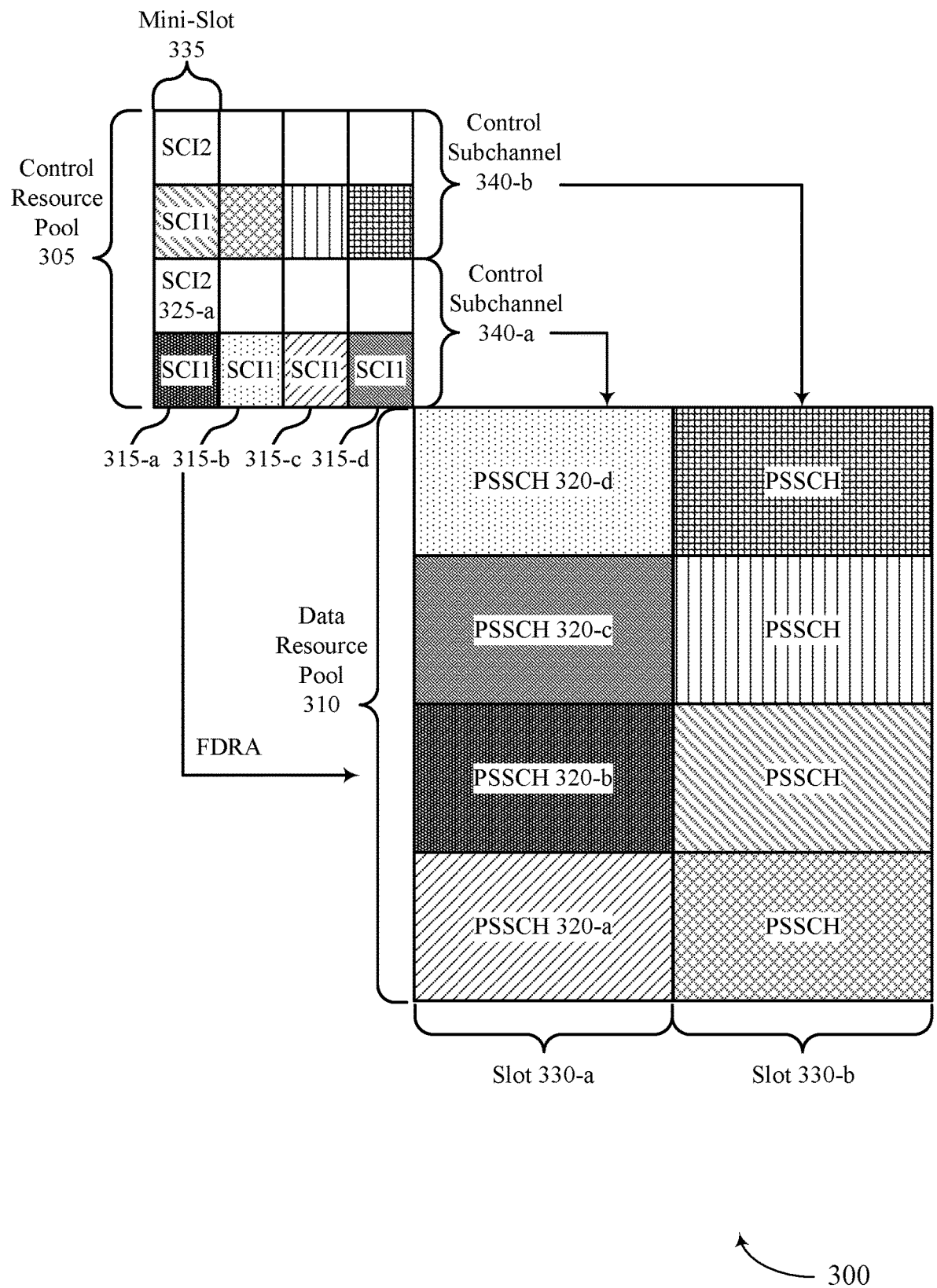
FIG. 3 illustrates an example of a sidelink resource configuration that supports techniques for sidelink joint channel sensing and resource selection in accordance with aspects of the present disclosure.

FIG. 3 illustrates an example of a sidelink resource configuration 300 that supports techniques for sidelink joint channel sensing and resource selection in accordance with aspects of the present disclosure. A wireless communications system may use decoupled control and data resource pools for sidelink communications. For example, the sidelink resource configuration 300 may include a control resource pool 305 and a data resource pool 310. The control resource pool 305 may be configured according to a minislot structure as described herein, including sidelink control channel resources 315 and shortened sidelink shared channel resources 325. A slot 330, such as a slot 330-a and a slot 330-b, may span the duration of multiple mini-slots 335.

Resources in the control resource pool 305 may be at least partially mapped to resources in the data resource pool 310. For example, there may be an implicit one-to-one mapping between control subchannels 340 in the control resource pool 305 to slots 330 in the data resource pool 310. In some cases, SCI in different control subchannels 340 may have different K0, corresponding to reservations in different slots 330. If a UE 115 transmits a first-stage SCI in a sidelink control channel resource 315 in control subchannel 340-*a*, the first-stage SCI may reserve a sidelink shared channel resource 320 in slot 330-*a*. Similarly, a first-stage SCI transmitted in control subchannel 340-*b* may reserve a sidelink shared channel resource 320 in slot 330-*b*. This may avoid collisions in the data resource pool 310 if UEs 115 are configured for half-duplex communications, where the UE 115 are unable to transmit and receive at the same time. This way, frequency division multiplexed SCI messages will reserve sidelink shared channel resources 320 in different slots 330.

A UE 115 may have scheduling flexibility in the frequency domain. For example, a set control mini-slots 335 in a control subchannel 340 may schedule sidelink shared channel resources 320 in a same slot, but each control mini-slot 335 may select a different subchannel in the data resource pool 310. For example, a first-stage SCI transmitted on a sidelink control channel resource 315-*a* may include an FDRA indicating a subchannel for sidelink shared channel resource 320-*b*. Similarly, a first-stage SCI transmitted on a sidelink control channel resource 315-*b* may include an FDRA indicating a subchannel for sidelink shared channel resource 320-*d*. First-stage SCI messages transmitted on sidelink control channel resources 315-*c* and 315-*d* may reserve sidelink shared channel resources 320-*a* and 320-*c*, respectively.

Figure 4:
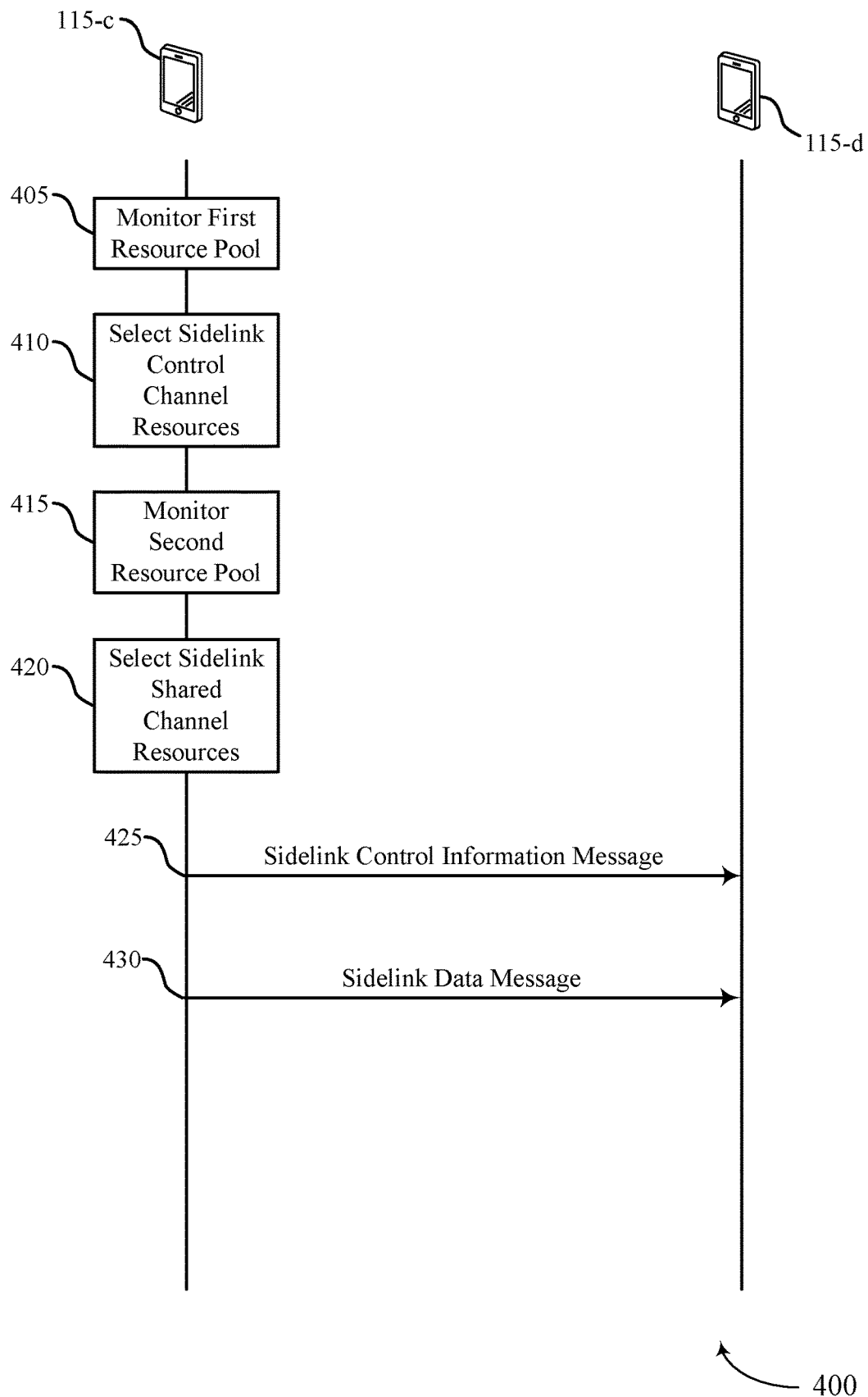
FIG. 4 illustrates an example of a process flow that supports techniques for sidelink joint channel sensing and resource selection in accordance with aspects of the present disclosure.

FIG. 4 illustrates an example of a process flow 400 that supports techniques for sidelink joint channel sensing and resource selection in accordance with aspects of the present disclosure. The process flow may be implemented by a UE 115-*c* or a UE 115-*d*, or both. The UE 115-*c* and the UE 115-*d* may be examples of UEs 115 described with reference to FIGS. 1 and 2. In some cases, the UE 115-*c* and the UE 115-*d* may each be an example of a new UE 115, which may support decoupled control and data resource pools for sidelink communications. In some cases, some operations or signaling of the process flow 400 may be performed in a different order than shown. Additionally, or alternatively, some additional processes or signaling may performed, or some processes or signaling shown may not be performed, or both.

At 405, the UE 115-*c* may monitor, during a first sensing window, a first resource pool associated with sidelink control signaling. For example, the UE 115-*c* may perform channel sensing on a control sensing window in a control resource pool of a decoupled resource pool configuration. The UE 115-*c* may monitor for first-stage SCI transmitted by other UEs 115 on control channel resources which may reserve other sidelink control channel resources or sidelink shared channel resources, or both.

In some cases, the UE 115-*c* may determine an RSRP projection on resources in a first resource selection window based on performing the channel sensing during the first sensing window. For example, the UE 115-*c* may identify projected RSRP on resources within the first resource selection window, which may project which resources are reserved or may have interference. If a projected RSRP for a resource is below a threshold, the resource may be identified or marked as available. If the projected RSRP for the resource is above the threshold, that resource may be identified or marked as unavailable.

In some cases, at 410, the UE 115-*c* may select one or more sidelink control channel resources from the first resource pool based on the monitoring during the first sensing window. For example, the UE 115-*c* may select a first sidelink control channel resource for an initial first-stage SCI message, and the UE 115-*c* may select up to two additional resources for retransmissions of the first-stage SCI message. In some examples, the UE 115-*c* may perform resource selection before or after performing channel sensing on a data resource pool.

At 415, the UE 115-*c* may monitor, during a second sensing window, at least a portion of a second resource pool associated with sidelink data signaling. For example, the UE 115-*c* may monitor, during a data sensing window, a portion of a data resource pool which at least partially overlaps a legacy resource pool. The UE 115-*c* may perform channel sensing on the portion of the data resource pool which overlaps the legacy resource pool to detect channel reservations and sidelink transmissions by legacy UEs 115. In some cases, if a legacy resource pool is not configured or the legacy resource pool does not overlap the sidelink data resource pool, the UE 115-*c* may not monitor the portion of the second resource pool during the second sensing window.

At 420, the UE 115-*c* may select one or more sidelink shared channel resources from the second resource pool based on the monitoring during the first sensing window and the monitoring during the second sensing window. For example, the UE 115-*c* may select one or more sidelink shared channel resources which do not overlap with any sidelink shared channel resources which were reserved from SCI identified in the control resource pool or the data resource pool.

For example, the UE 115-*c* may estimate a second RSRP projection on the second resource pool based on monitoring the first resource pool and monitoring the second resource pool. The UE 115-*c* may identify RSRP projections on the second resource pool both from any SCI detected on the control resource pool as well as from SCI or sidelink data transmissions detected on the overlapping portion of the data resource pool.

In some cases, the UE 115-*c* may take a maximum projected RSRP from multiple sensing windows (e.g., the first sensing window and the second sensing window) for a given data resource pool resource. For example, the UE 115-*c* may identify a first RSRP projection on a sidelink shared channel resource from performing channel sensing on the control resource pool, and the UE 115-*c* may identify a second RSRP projection on the sidelink shared channel resource from performing channel sensing on the portion of the data resource pool, and the UE 115-*c* may use the greater of the first and second RSRP projections for determining whether the sidelink shared channel resource is available.

In another example, the UE 115-*c* may take a sum of the projected RSRPs from the multiple sensing window for a given data resource pool resource. For example, the UE 115-*c* may determine a first RSRP projection on a sidelink shared channel resource by performing channel sensing on the control resource pool, and the UE 115-*c* may determine a second RSRP projection on the sidelink shared channel resource by performing channel sensing on the overlapping portion of the data resource pool. The UE 115-*c* may combine the first RSRP projection and the second RSRP projection to determine whether the sidelink shared channel resource is available.

If an RSRP projection for a resource is below a threshold, the UE 115-*c* may identify that resource as available. If the RSRP projection for the resource is above the threshold, the UE 115-*c* may identify that resource is unavailable, or a resource which may lead to collision or interference if selected. In some cases, different resource pools may have different RSRP threshold. For example, the UE 115-c may use a first RSRP threshold for the first resource pool, and the UE 115-c may use a second RSRP threshold for the second resource pool. In some cases, signaling with different priority may also have different RSRP thresholds. For example, the UE 115-c may use different RSRP thresholds for high priority signaling and low priority signaling.

In some cases, there may be a mapping between subchannels of the control resource pool and slots of the data resource pool. For example, different control subchannels may map to different data slots. Within the same control subchannel, SCI message in different mini-slots may select different subchannels of the data resource pool. For example, a TDRA of a first-stage SCI may correspond to the mapped slot, but an FDRA of the first-stage SCI may select from one of the subchannels of the data resource pool within the mapped slot. This may prevent collisions between half-duplex UEs 115, as frequency division multiplexed SCI messages from different UEs 115 may correspond to different slots.

At 425, the UE 115-c may transmit, on a first sidelink control channel resource from the first resource pool, a first SCI message reserving the selected one or more sidelink control channel resources from the first resource pool and reserving the selected one or more sidelink shared channel resources from the second resource pool for a sidelink data message. In some cases, the UE 115-c may perform a list-minute evaluation before transmitting the first SCI message to determine that there are no collisions in both resource selection windows. For example, the UE 115-c may verify that there is no anticipated collision on the selected sidelink control channel resources or sidelink shared channel resources.

The first SCI message may include separate sets of resource indication fields for the sidelink control channel resources and the sidelink shared channel resources. For example, the first SCI message may include a first TDRA field and a first FDRA field indicating the one or more sidelink control channel resources. The first SCI message may also include a second TDRA field and a second FDRA field indicating the one or mor sidelink shared channel resources.

The UE 115-d may receive the first SCI message including the first set of resource allocation fields reserving the one or more sidelink control channel resources from the first resource pool and the second set of resource allocation fields reserving the one or more sidelink shared channel resources from the second resource pool.

At 430, the UE 115-c may transmit the sidelink data message on the one or more reserved sidelink shared channel resources. The UE 115-d may receive the sidelink data message on the one or more sidelink shared channel resources based on receiving the SCI message.

In some cases, the UE 115-c may transmit a second SCI message on the portion of the second resource pool that at least partially overlaps the legacy resource pool. For example, the UE 115-c may transmit SCI on the sidelink shared channel resources carrying the sidelink data message in order to indicate to legacy UEs 115 that the sidelink shared channel resource is reserved.

By implementing these techniques, the UE 115-c may transmit a sidelink data message to the UE 115-c using decoupled control and data resource pools. These techniques may provide the UE 115-c with some scheduling flexibility while preventing collisions on the control resource pool and data resource pool.

Figure 5:
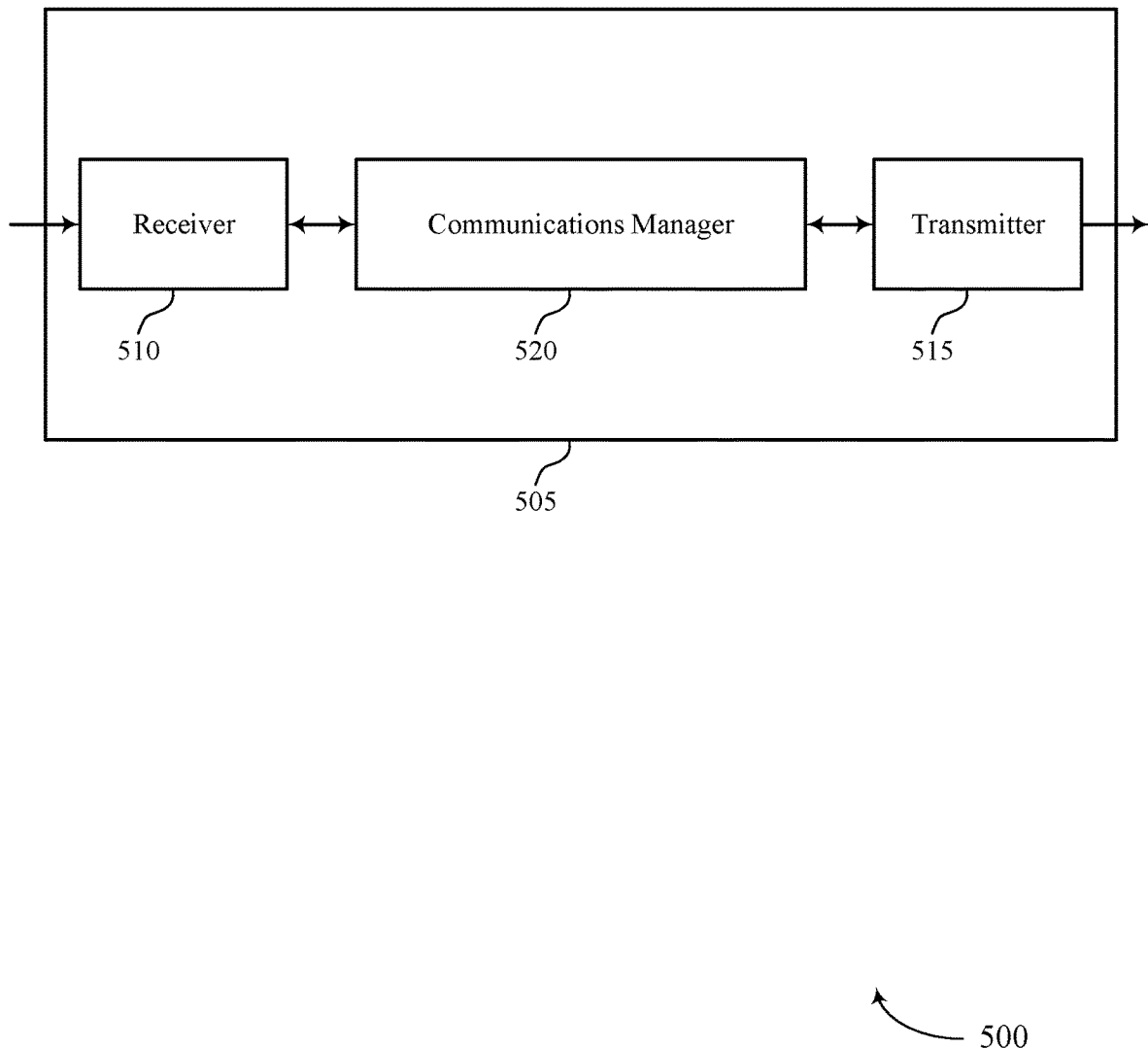
FIGS. 5 and 6 show block diagrams of devices that support techniques for sidelink joint channel sensing and resource selection in accordance with aspects of the present disclosure.

FIG. 5 shows a block diagram 500 of a device 505 that supports techniques for sidelink joint channel sensing and resource selection in accordance with aspects of the present disclosure. The device 505 may be an example of aspects of a UE 115 as described herein. The device 505 may include a receiver 510, a transmitter 515, and a communications manager 520. The device 505 may also include a one or more processors, memory coupled with the one or more processors, and instructions stored in the memory that are executable by the one or more processors to enable the one or more processors to perform the joint channel sensing and joint resource selection features discussed herein. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for sidelink joint channel sensing and resource selection). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for sidelink joint channel sensing and resource selection). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for sidelink joint channel sensing and resource selection as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for monitoring, during a first sensing window, a first resource pool associated with sidelink control signaling. The communications manager 520 may be configured as or otherwise support a means for selecting one or more sidelink control channel resources from the first resource pool based on the monitoring during the first sensing window. The communications manager 520 may be configured as or otherwise support a means for monitoring, during a second sensing window, at least a portion of a second resource pool associated with sidelink data signaling. The communications manager 520 may be configured as or otherwise support a means for selecting one or more sidelink shared channel resources from the second resource pool based on the monitoring during the first sensing window and the monitoring during the second sensing window. The communications manager 520 may be configured as or otherwise support a means for transmitting, on a first sidelink control channel resource from the first resource pool, a first SCI message reserving the selected one or more sidelink control channel resources from the first resource pool and reserving the selected one or more sidelink shared channel resources from the second resource pool for a sidelink data message. The communications manager 520 may be configured as or otherwise support a means for transmitting the sidelink data message on the one or more reserved sidelink shared channel resources.

Additionally or alternatively, the communications manager 520 may support wireless communications at a UE in accordance with examples as disclosed herein. For example, the communications manager 520 may be configured as or otherwise support a means for receiving, on a sidelink control channel resource of a first resource pool, an SCI message including a first set of resource allocation fields reserving one or more sidelink control channel resources and a second set of resource allocation fields reserving one or more sidelink shared channel resources in a second resource pool for a sidelink data message. The communications manager 520 may be configured as or otherwise support a means for receiving the sidelink data message on the one or more sidelink shared channel resources in the second resource pool based on receiving the SCI message.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption by preventing collisions of sidelink signaling.

Figure 6:
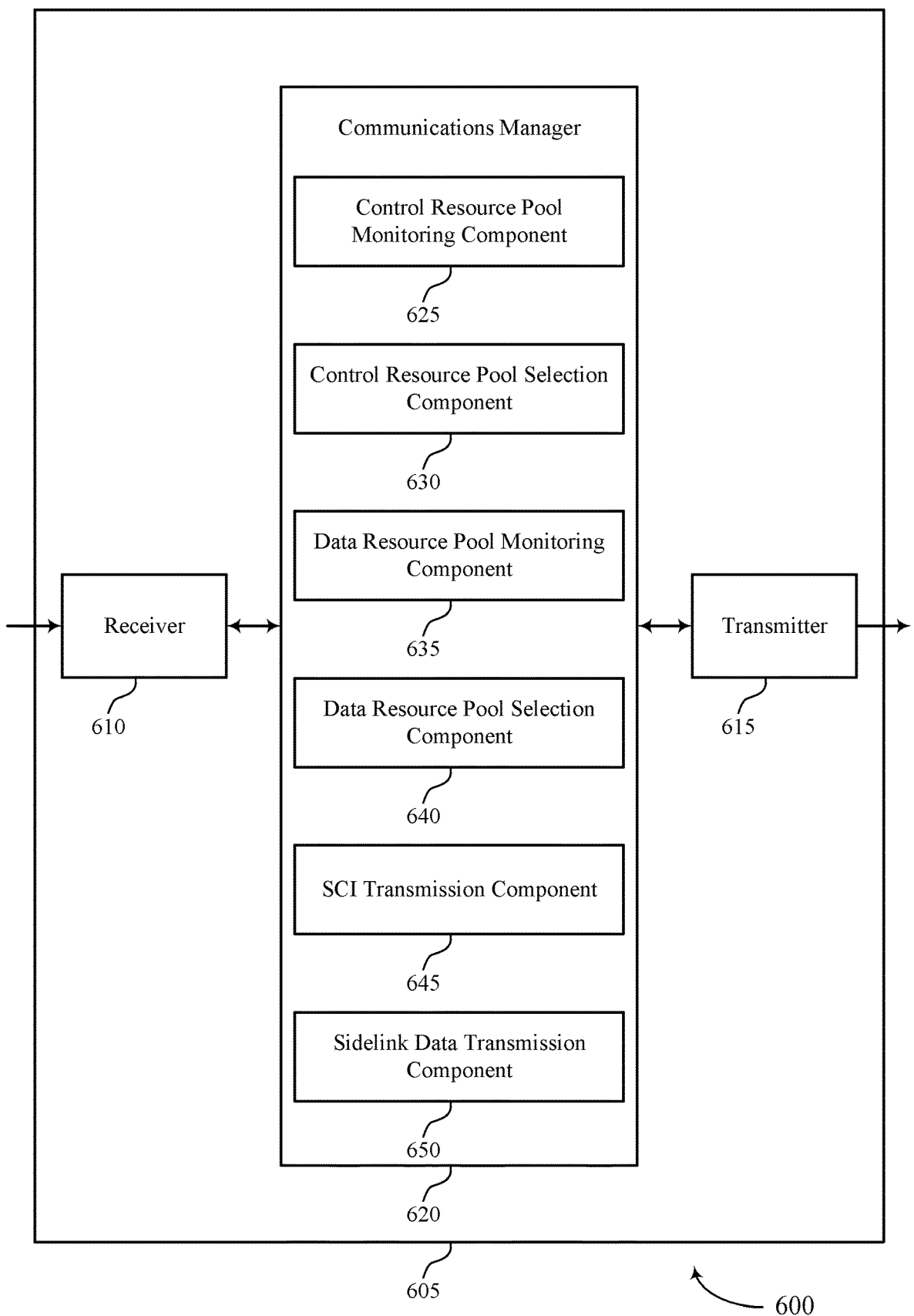

FIG. 6 shows a block diagram 600 of a device 605 that supports techniques for sidelink joint channel sensing and resource selection in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for sidelink joint channel sensing and resource selection). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for sidelink joint channel sensing and resource selection). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for sidelink joint channel sensing and resource selection as described herein. For example, the communications manager 620 may include a control resource pool monitoring component 625, a control resource pool selection component 630, a data resource pool monitoring component 635, a data resource pool selection component 640, an SCI transmission component 645, a sidelink data transmission component 650, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The control resource pool monitoring component 625 may be configured as or otherwise support a means for monitoring, during a first sensing window, a first resource pool associated with sidelink control signaling. The control resource pool selection component 630 may be configured as or otherwise support a means for selecting one or more sidelink control channel resources from the first resource pool based on the monitoring during the first sensing window. The data resource pool monitoring component 635 may be configured as or otherwise support a means for monitoring, during a second sensing window, at least a portion of a second resource pool associated with sidelink data signaling. The data resource pool selection component 640 may be configured as or otherwise support a means for selecting one or more sidelink shared channel resources from the second resource pool based on the monitoring during the first sensing window and the monitoring during the second sensing window. The SCI transmission component 645 may be configured as or otherwise support a means for transmitting, on a first sidelink control channel resource from the first resource pool, a first SCI message reserving the selected one or more sidelink control channel resources from the first resource pool and reserving the selected one or more sidelink shared channel resources from the second resource pool for a sidelink data message. The sidelink data transmission component 650 may be configured as or otherwise support a means for transmitting the sidelink data message on the one or more reserved sidelink shared channel resources.

In some cases, the control resource pool monitoring component 625, the control resource pool selection component 630, the data resource pool monitoring component 635, the data resource pool selection component 640, the SCI transmission component 645, and the sidelink data transmission component 650 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control resource pool monitoring component 625, the control resource pool selection component 630, the data resource pool monitoring component 635, the data resource pool selection component 640, the SCI transmission component 645, and the sidelink data transmission component 650 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Additionally or alternatively, the communications manager 620 may support wireless communications at a UE in accordance with examples as disclosed herein. The control resource pool monitoring component 625 may be configured as or otherwise support a means for receiving, on a sidelink control channel resource of a first resource pool, an SCI message including a first set of resource allocation fields reserving one or more sidelink control channel resources and a second set of resource allocation fields reserving one or more sidelink shared channel resources in a second resource pool for a sidelink data message. The data resource pool monitoring component 635 may be configured as or otherwise support a means for receiving the sidelink data message on the one or more sidelink shared channel resources in the second resource pool based on receiving the SCI message.

Figure 7:
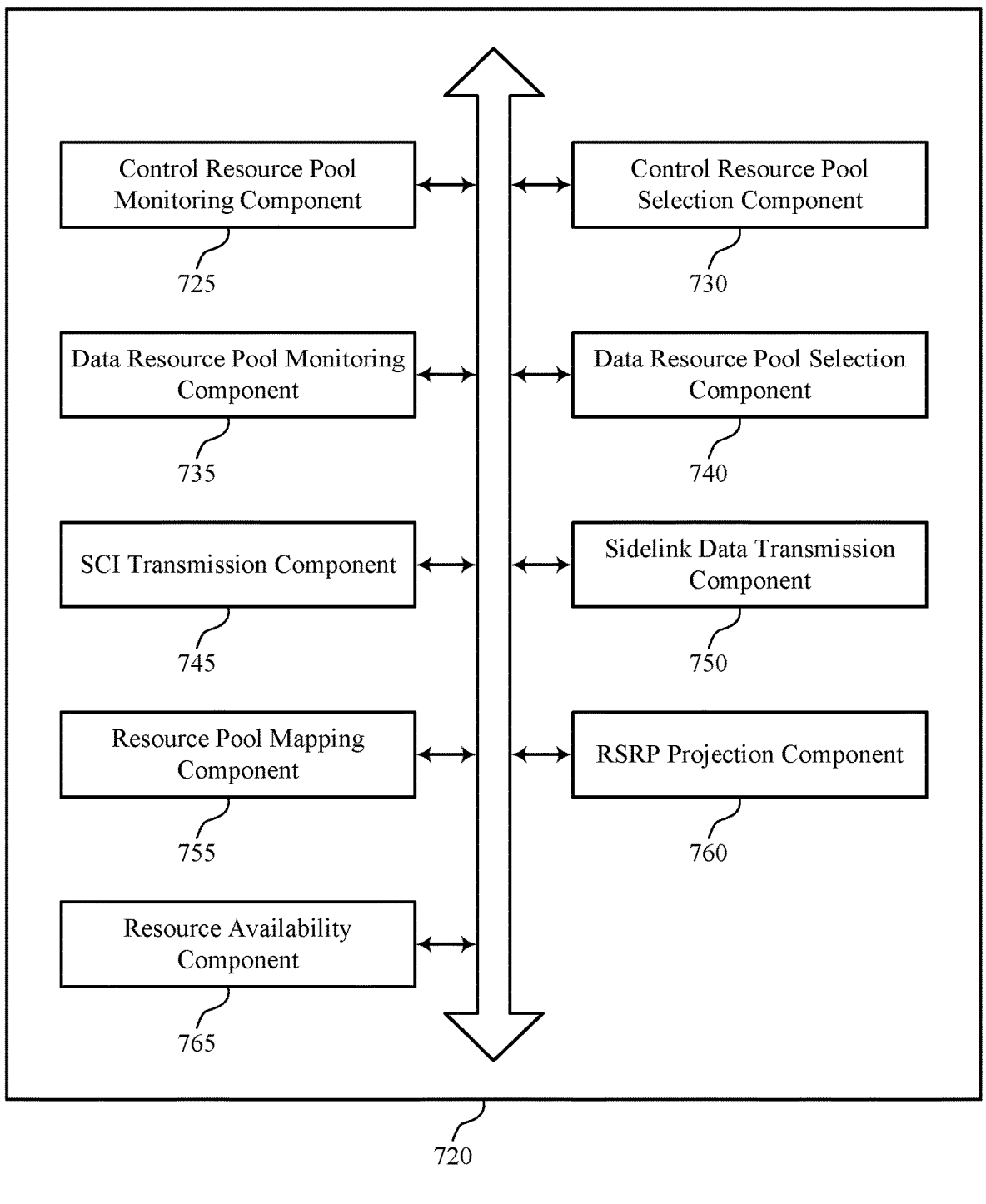
FIG. 7 shows a block diagram of a communications manager that supports techniques for sidelink joint channel sensing and resource selection in accordance with aspects of the present disclosure.

FIG. 7 shows a block diagram 700 of a communications manager 720 that supports techniques for sidelink joint channel sensing and resource selection in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for sidelink joint channel sensing and resource selection as described herein. For example, the communications manager 720 may include a control resource pool monitoring component 725, a control resource pool selection component 730, a data resource pool monitoring component 735, a data resource pool selection component 740, an SCI transmission component 745, a sidelink data transmission component 750, a resource pool mapping component 755, an RSRP projection component 760, a resource availability component 765, or any combination thereof. Each of these components may communicate, directly or indirectly, with one another (e.g., via one or more buses).

The communications manager 720 may support wireless communications at a UE in accordance with examples as disclosed herein. The control resource pool monitoring component 725 may be configured as or otherwise support a means for monitoring, during a first sensing window, a first resource pool associated with sidelink control signaling. The control resource pool selection component 730 may be configured as or otherwise support a means for selecting one or more sidelink control channel resources from the first resource pool based on the monitoring during the first sensing window. The data resource pool monitoring component 735 may be configured as or otherwise support a means for monitoring, during a second sensing window, at least a portion of a second resource pool associated with sidelink data signaling. The data resource pool selection component 740 may be configured as or otherwise support a means for selecting one or more sidelink shared channel resources from the second resource pool based on the monitoring during the first sensing window and the monitoring during the second sensing window. The SCI transmission component 745 may be configured as or otherwise support a means for transmitting, on a first sidelink control channel resource from the first resource pool, a first SCI message reserving the selected one or more sidelink control channel resources from the first resource pool and reserving the selected one or more sidelink shared channel resources from the second resource pool for a sidelink data message. The sidelink data transmission component 750 may be configured as or otherwise support a means for transmitting the sidelink data message on the one or more reserved sidelink shared channel resources.

In some examples, to support transmitting the first SCI message, the SCI transmission component 745 may be configured as or otherwise support a means for transmitting the first SCI message including a first time domain resource allocation field and a first frequency domain resource allocation field indicating the one or more sidelink control channel resources and including a second time domain resource allocation field and a second frequency domain resource allocation field indicating the one or more sidelink shared channel resources.

In some examples, to support selecting, the control resource pool selection component 730 may be configured as or otherwise support a means for selecting the one or more sidelink control channel resources from the first resource pool according to a first resource selection window from the first sidelink control channel resource. In some examples, to support selecting, the data resource pool selection component 740 may be configured as or otherwise support a means for selecting the one or more sidelink shared channel resources from the second resource pool according to a second resource selection window from the first sidelink control channel resource.

In some examples, the first resource selection window is associated with a first starting time and a first duration, and the second resource selection window is associated with a second starting time and a second duration.

In some examples, to support transmitting the first SCI message, the resource pool mapping component 755 may be configured as or otherwise support a means for transmitting the first SCI message on a subchannel that is mapped to a slot of the second resource pool, where the first SCI message reserves a first sidelink shared channel resource of the one or more sidelink shared channel resources in the slot based on the subchannel being mapped.

In some examples, the resource pool mapping component 755 may be configured as or otherwise support a means for indicating, via a frequency domain resource allocation field of the first SCI message, a subchannel of the slot of the second resource pool for the first sidelink shared channel resource.

In some examples, to support monitoring the first resource pool during the first sensing window, the control resource pool monitoring component 725 may be configured as or otherwise support a means for detecting, on the first resource pool during the first sensing window, a second SCI message reserving a second sidelink control channel resource and a second sidelink shared channel resource. In some examples, to support monitoring the first resource pool during the first sensing window, the control resource pool selection component 730 may be configured as or otherwise support a means for selecting the one or more sidelink control channel resources which do not overlap with the second sidelink control channel resource. In some examples, to support monitoring the first resource pool during the first sensing window, the data resource pool selection component 740 may be configured as or otherwise support a means for selecting the one or more sidelink shared channel resources which do not overlap with the second sidelink shared channel resource.

In some examples, to support monitoring the second resource pool during the second sensing window, the data resource pool monitoring component 735 may be configured as or otherwise support a means for detecting, on the second resource pool during the second sensing window, a second SCI message reserving a second sidelink shared channel resource. In some examples, to support monitoring the second resource pool during the second sensing window, the data resource pool selection component 740 may be configured as or otherwise support a means for selecting the one or more sidelink shared channel resources which do not overlap with the second sidelink shared channel resource.

In some examples, the SCI transmission component 745 may be configured as or otherwise support a means for transmitting a second SCI message on the portion of the second resource pool that is at least partially overlapping a third resource pool, where the second SCI message indicates the one or more sidelink shared channel resources in the portion of the second resource pool that is at least partially overlapping the third resource pool.

In some examples, the RSRP projection component 760 may be configured as or otherwise support a means for estimating a first RSRP projection on the first resource pool based at least in part monitoring the first resource pool during the first sensing window, where the one or more sidelink control channel resources are selected based on the first RSRP projection. In some examples, the RSRP projection component 760 may be configured as or otherwise support a means for estimating a second RSRP projection on the second resource pool based at least in part monitoring the first resource pool and monitoring the second resource pool, where the one or more sidelink shared channel resources are selected based on the second RSRP projection.

In some examples, to support selecting, the control resource pool selection component 730 may be configured as or otherwise support a means for selecting the one or more sidelink control channel resources based on the first RSRP projection for the one or more sidelink control channel resources satisfying a first threshold. In some examples, to support selecting, the data resource pool selection component 740 may be configured as or otherwise support a means for selecting the one or more sidelink shared channel resources based on the second RSRP projection for the one or more sidelink shared channel resources satisfying a second threshold.

In some examples, the one or more sidelink shared channel resources are offset in time from the one or more sidelink control channel resources by a configured number of slots. In some examples, the configured number of slots is based on a capability of the UE.

In some examples, the first threshold is based on a first priority of signaling associated with the one or more sidelink control channel resources or a first resource candidate availability in the first resource pool, or both, and the second threshold is based on a second priority of signaling associated with the one or more sidelink shared channel resources or a second resource candidate availability in the second resource pool, or both. In some examples, the one or more sidelink control channel resources are selected randomly. In some examples, the one or more sidelink shared channel resources are selected based on channel state information for the second resource pool.

In some examples, the data resource pool selection component 740 may be configured as or otherwise support a means for selecting the one or more sidelink shared channel resources based on a highest RSRP projection from the first RSRP projection and the second RSRP projection.

In some examples, the data resource pool selection component 740 may be configured as or otherwise support a means for selecting the one or more sidelink shared channel resources based on a sum of the first RSRP projection and the second RSRP projection.

In some examples, the resource availability component 765 may be configured as or otherwise support a means for determining the first sidelink control channel resource is available prior to transmission, where the first SCI message is transmitted based at least in part the first sidelink control channel resource being available. In some examples, the resource availability component 765 may be configured as or otherwise support a means for determining the one or more sidelink shared channel resources are available prior to transmission, where the sidelink data message is transmitted based at least in part the one or more sidelink shared channel resources being available.

Additionally or alternatively, the communications manager 720 may support wireless communications at a UE in accordance with examples as disclosed herein. In some examples, the control resource pool monitoring component 725 may be configured as or otherwise support a means for receiving, on a sidelink control channel resource of a first resource pool, an SCI message including a first set of resource allocation fields reserving one or more sidelink control channel resources and a second set of resource allocation fields reserving one or more sidelink shared channel resources in a second resource pool for a sidelink data message. In some examples, the data resource pool monitoring component 735 may be configured as or otherwise support a means for receiving the sidelink data message on the one or more sidelink shared channel resources in the second resource pool based on receiving the SCI message.

In some examples, to support receiving the SCI message, the control resource pool monitoring component 725 may be configured as or otherwise support a means for receiving the SCI message including a first time domain resource allocation field and a first frequency domain resource allocation field indicating the one or more sidelink control channel resources and including a second time domain resource allocation field and a second frequency domain resource allocation field indicating the one or more sidelink shared channel resources.

In some examples, the control resource pool monitoring component 725 may be configured as or otherwise support a means for monitoring the one or more sidelink control channel resources in the first resource pool for a retransmission of the SCI message based on the first set of resource allocation fields.

Figure 8:
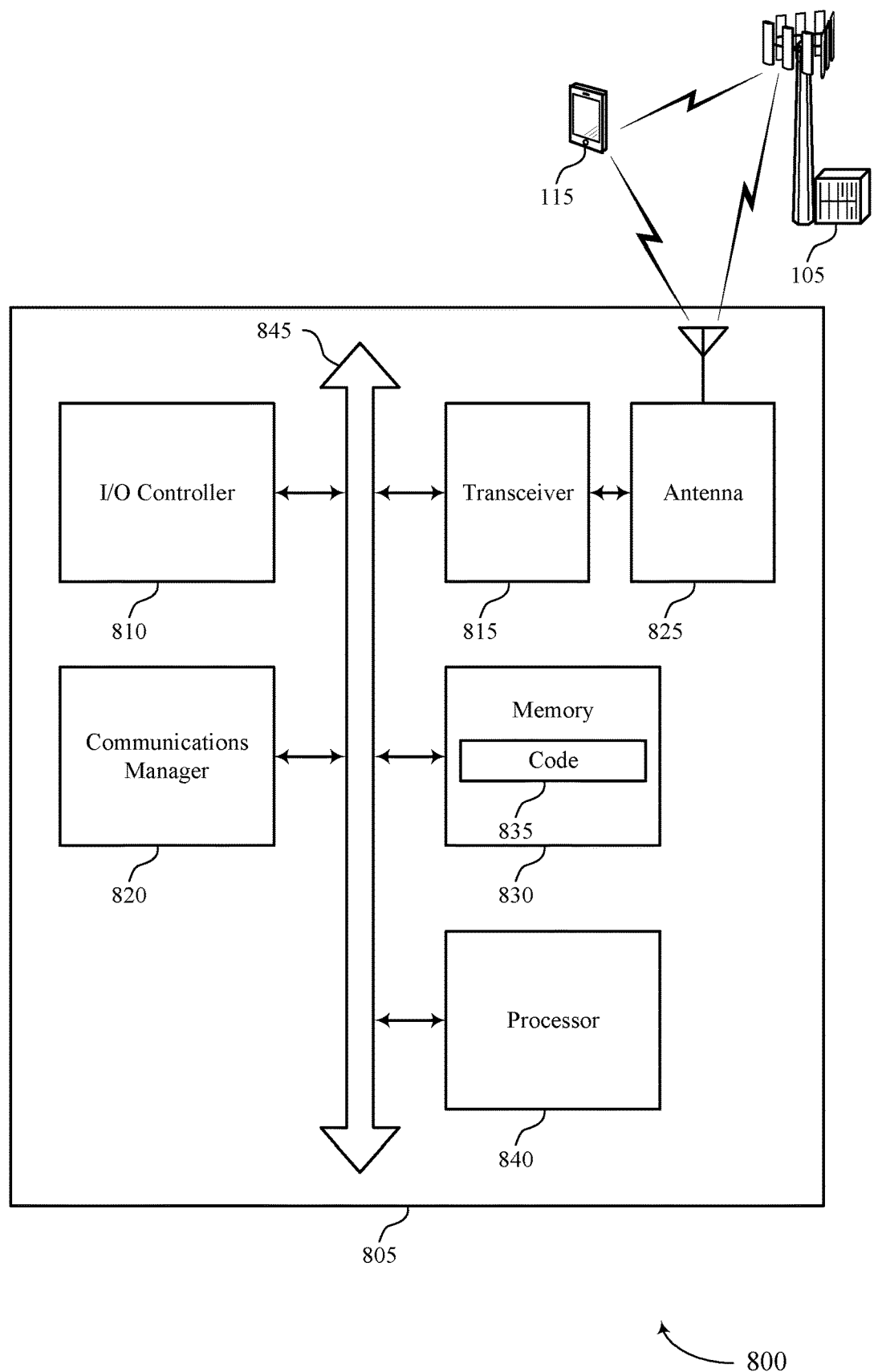
FIG. 8 shows a diagram of a system including a device that supports techniques for sidelink joint channel sensing and resource selection in accordance with aspects of the present disclosure.

In some cases, the control resource pool monitoring component 725, the control resource pool selection component 730, the data resource pool monitoring component 735, the data resource pool selection component 740, the SCI transmission component 745, the sidelink data transmission component 750, the resource pool mapping component 755, the RSRP projection component 760, and the resource availability component 765 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control resource pool monitoring component 725, the control resource pool selection component 730, the data resource pool monitoring component 735, the data resource pool selection component 740, the SCI transmission component 745, the sidelink data transmission component 750, the resource pool mapping component 755, the RSRP projection component 760, and the resource availability component 765 discussed herein FIG. 8 shows a diagram of a system 800 including a device 805 that supports techniques for sidelink joint channel sensing and resource selection in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for sidelink joint channel sensing and resource selection). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for monitoring, during a first sensing window, a first resource pool associated with sidelink control signaling. The communications manager 820 may be configured as or otherwise support a means for selecting one or more sidelink control channel resources from the first resource pool based on the monitoring during the first sensing window. The communications manager 820 may be configured as or otherwise support a means for monitoring, during a second sensing window, at least a portion of a second resource pool associated with sidelink data signaling. The communications manager 820 may be configured as or otherwise support a means for selecting one or more sidelink shared channel resources from the second resource pool based on the monitoring during the first sensing window and the monitoring during the second sensing window. The communications manager 820 may be configured as or otherwise support a means for transmitting, on a first sidelink control channel resource from the first resource pool, a first SCI message reserving the selected one or more sidelink control channel resources from the first resource pool and reserving the selected one or more sidelink shared channel resources from the second resource pool for a sidelink data message. The communications manager 820 may be configured as or otherwise support a means for transmitting the sidelink data message on the one or more reserved sidelink shared channel resources.

Additionally or alternatively, the communications manager 820 may support wireless communications at a UE in accordance with examples as disclosed herein. For example, the communications manager 820 may be configured as or otherwise support a means for receiving, on a sidelink control channel resource of a first resource pool, an SCI message including a first set of resource allocation fields reserving one or more sidelink control channel resources and a second set of resource allocation fields reserving one or more sidelink shared channel resources in a second resource pool for a sidelink data message. The communications manager 820 may be configured as or otherwise support a means for receiving the sidelink data message on the one or more sidelink shared channel resources in the second resource pool based on receiving the SCI message.

By including or configuring the communications manager 820 in accordance with examples as described herein, the device 805 may support techniques for increased reliability and improved scheduling flexibility for sidelink signaling. For example, these techniques may prevent collisions of sidelink data signaling while providing some scheduling flexibility for the transmitter.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for sidelink joint channel sensing and resource selection as described herein, or the processor 840 and the memory 830 may be otherwise configured to perform or support such operations.

Figure 9:
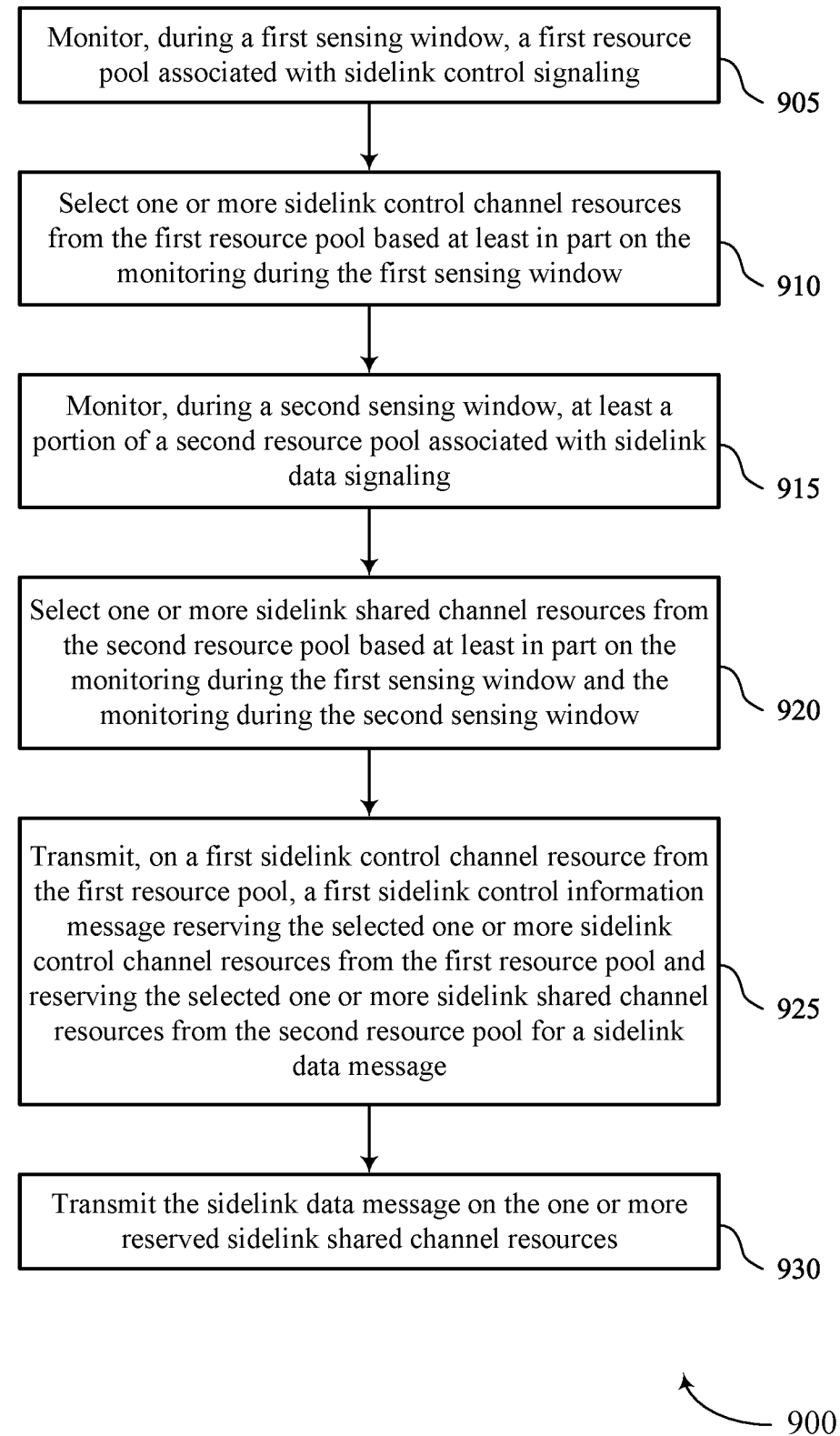
FIGS. 9 through 12 show flowcharts illustrating methods that support techniques for sidelink joint channel sensing and resource selection in accordance with aspects of the present disclosure.

FIG. 9 shows a flowchart illustrating a method 900 that supports techniques for sidelink joint channel sensing and resource selection in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include monitoring, during a first sensing window, a first resource pool associated with sidelink control signaling. The operations of 905 may be performed in accordance with examples as disclosed herein. In some examples, aspects of the operations of 905 may be performed by a control resource pool monitoring component 725 as described with reference to FIG. 7.

At 910, the method may include selecting one or more sidelink control channel resources from the first resource pool based on the monitoring during the first sensing window. The operations of 910 may be performed in accordance with examples as disclosed herein. In some examples, aspects of the operations of 910 may be performed by a control resource pool selection component 730 as described with reference to FIG. 7.

At 915, the method may include monitoring, during a second sensing window, at least a portion of a second resource pool associated with sidelink data signaling. The operations of 915 may be performed in accordance with examples as disclosed herein. In some examples, aspects of the operations of 915 may be performed by a data resource pool monitoring component 735 as described with reference to FIG. 7.

At 920, the method may include selecting one or more sidelink shared channel resources from the second resource pool based on the monitoring during the first sensing window and the monitoring during the second sensing window. The operations of 920 may be performed in accordance with examples as disclosed herein. In some examples, aspects of the operations of 920 may be performed by a data resource pool selection component 740 as described with reference to FIG. 7.

At 925, the method may include transmitting, on a first sidelink control channel resource from the first resource pool, a first SCI message reserving the selected one or more sidelink control channel resources from the first resource pool and reserving the selected one or more sidelink shared channel resources from the second resource pool for a sidelink data message. The operations of 925 may be performed in accordance with examples as disclosed herein. In some examples, aspects of the operations of 925 may be performed by an SCI transmission component 745 as described with reference to FIG. 7.

At 930, the method may include transmitting the sidelink data message on the one or more reserved sidelink shared channel resources. The operations of 930 may be performed in accordance with examples as disclosed herein. In some examples, aspects of the operations of 930 may be performed by a sidelink data transmission component 750 as described with reference to FIG. 7.

Figure 10:
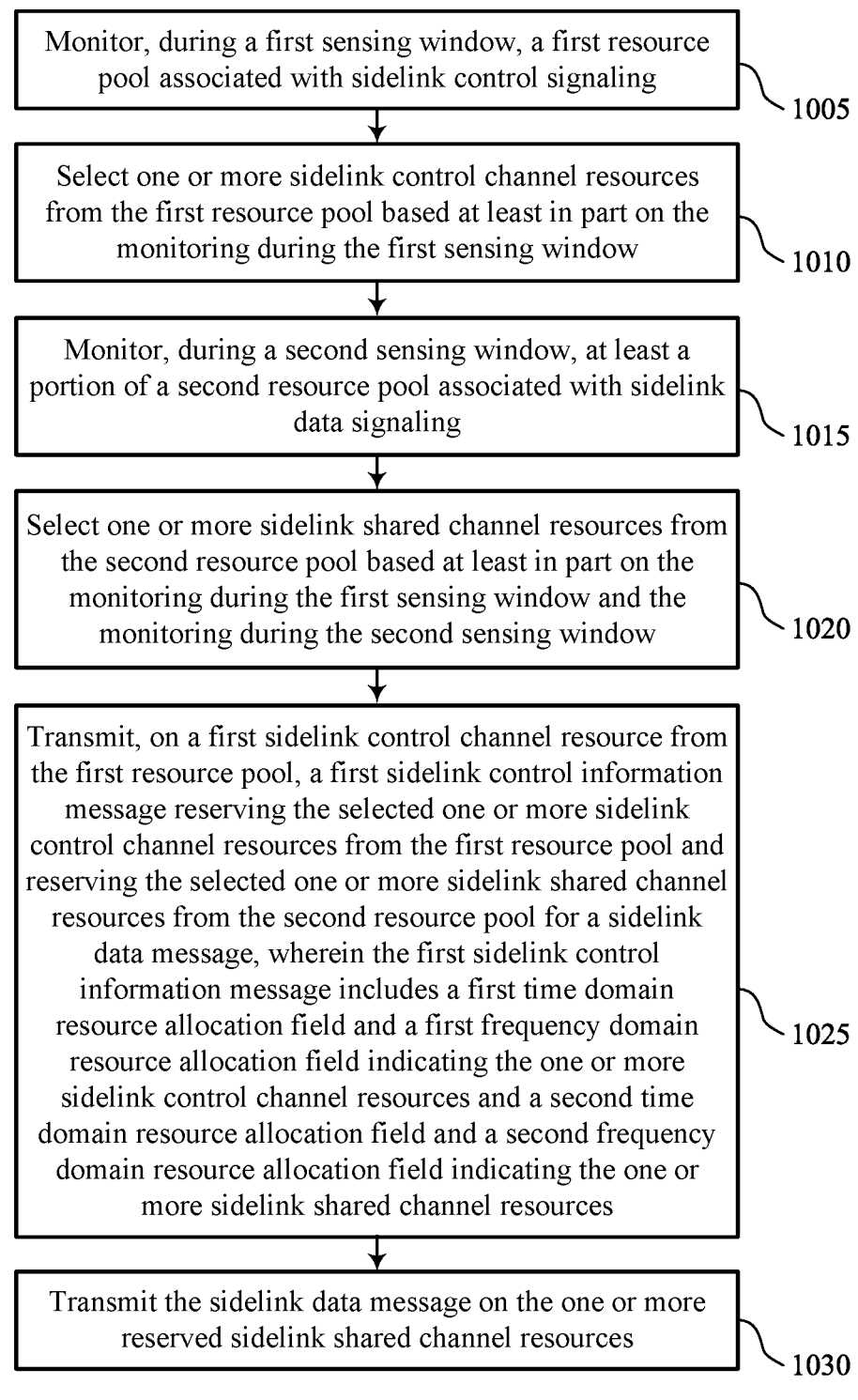

FIG. 10 shows a flowchart illustrating a method 1000 that supports techniques for sidelink joint channel sensing and resource selection in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include monitoring, during a first sensing window, a first resource pool associated with sidelink control signaling. The operations of 1005 may be performed in accordance with examples as disclosed herein. In some examples, aspects of the operations of 1005 may be performed by a control resource pool monitoring component 725 as described with reference to FIG. 7.

At 1010, the method may include selecting one or more sidelink control channel resources from the first resource pool based on the monitoring during the first sensing window. The operations of 1010 may be performed in accordance with examples as disclosed herein. In some examples, aspects of the operations of 1010 may be performed by a control resource pool selection component 730 as described with reference to FIG. 7.

At 1015, the method may include monitoring, during a second sensing window, at least a portion of a second resource pool associated with sidelink data signaling. The operations of 1015 may be performed in accordance with examples as disclosed herein. In some examples, aspects of the operations of 1015 may be performed by a data resource pool monitoring component 735 as described with reference to FIG. 7.

At 1020, the method may include selecting one or more sidelink shared channel resources from the second resource pool based on the monitoring during the first sensing window and the monitoring during the second sensing window. The operations of 1020 may be performed in accordance with examples as disclosed herein. In some examples, aspects of the operations of 1020 may be performed by a data resource pool selection component 740 as described with reference to FIG. 7.

At 1025, the method may include transmitting, on a first sidelink control channel resource from the first resource pool, a first SCI message reserving the selected one or more sidelink control channel resources from the first resource pool and reserving the selected one or more sidelink shared channel resources from the second resource pool for a sidelink data message. The first SCI message may include a first time domain resource allocation field and a first frequency domain resource allocation field indicating the one or more sidelink control channel resources and a second time domain resource allocation field and a second frequency domain resource allocation field indicating the one or more sidelink shared channel resources. The operations of 1025 may be performed in accordance with examples as disclosed herein. In some examples, aspects of the operations of 1025 may be performed by an SCI transmission component 745 as described with reference to FIG. 7.

At 1030, the method may include transmitting the sidelink data message on the one or more reserved sidelink shared channel resources. The operations of 1030 may be performed in accordance with examples as disclosed herein. In some examples, aspects of the operations of 1030 may be performed by a sidelink data transmission component 750 as described with reference to FIG. 7.

At 1035, the method may include transmitting the first SCI message including a first time domain resource allocation field and a first frequency domain resource allocation field indicating the one or more sidelink control channel resources and including a second time domain resource allocation field and a second frequency domain resource allocation field indicating the one or more sidelink shared channel resources. The operations of 1035 may be performed in accordance with examples as disclosed herein. In some examples, aspects of the operations of 1035 may be performed by an SCI transmission component 745 as described with reference to FIG. 7.

Figure 11:
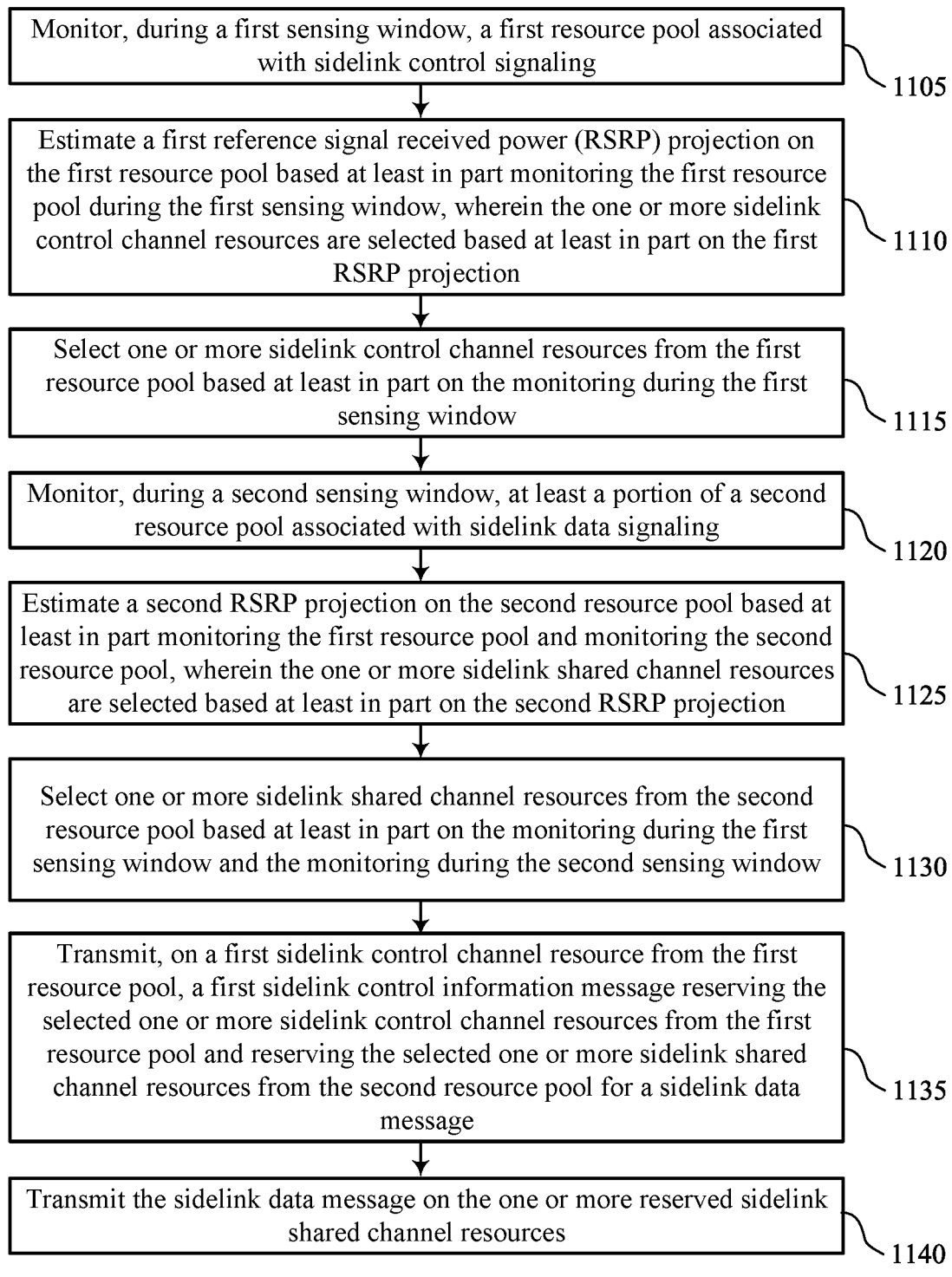

FIG. 11 shows a flowchart illustrating a method 1100 that supports techniques for sidelink joint channel sensing and resource selection in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include monitoring, during a first sensing window, a first resource pool associated with sidelink control signaling. The operations of 1105 may be performed in accordance with examples as disclosed herein. In some examples, aspects of the operations of 1105 may be performed by a control resource pool monitoring component 725 as described with reference to FIG. 7.

At 1110, the method may include estimating a first RSRP projection on the first resource pool based at least in part monitoring the first resource pool during the first sensing window, where the one or more sidelink control channel resources are selected based on the first RSRP projection. The operations of 1110 may be performed in accordance with examples as disclosed herein. In some examples, aspects of the operations of 1110 may be performed by an RSRP projection component 760 as described with reference to FIG. 7.

At 1115, the method may include selecting one or more sidelink control channel resources from the first resource pool based on the monitoring during the first sensing window. The operations of 1115 may be performed in accordance with examples as disclosed herein. In some examples, aspects of the operations of 1115 may be performed by a control resource pool selection component 730 as described with reference to FIG. 7.

At 1120, the method may include monitoring, during a second sensing window, at least a portion of a second resource pool associated with sidelink data signaling. The operations of 1120 may be performed in accordance with examples as disclosed herein. In some examples, aspects of the operations of 1120 may be performed by a data resource pool monitoring component 735 as described with reference to FIG. 7.

At 1125, the method may include estimating a second RSRP projection on the second resource pool based at least in part monitoring the first resource pool and monitoring the second resource pool, where the one or more sidelink shared channel resources are selected based on the second RSRP projection. The operations of 1125 may be performed in accordance with examples as disclosed herein. In some examples, aspects of the operations of 1125 may be performed by an RSRP projection component 760 as described with reference to FIG. 7.

At 1130, the method may include selecting one or more sidelink shared channel resources from the second resource pool based on the monitoring during the first sensing window and the monitoring during the second sensing window. The operations of 1130 may be performed in accordance with examples as disclosed herein. In some examples, aspects of the operations of 1130 may be performed by a data resource pool selection component 740 as described with reference to FIG. 7.

At 1135, the method may include transmitting, on a first sidelink control channel resource from the first resource pool, a first SCI message reserving the selected one or more sidelink control channel resources from the first resource pool and reserving the selected one or more sidelink shared channel resources from the second resource pool for a sidelink data message. The operations of 1135 may be performed in accordance with examples as disclosed herein. In some examples, aspects of the operations of 1135 may be performed by an SCI transmission component 745 as described with reference to FIG. 7.

At 1140, the method may include transmitting the sidelink data message on the one or more reserved sidelink shared channel resources. The operations of 1140 may be performed in accordance with examples as disclosed herein. In some examples, aspects of the operations of 1140 may be performed by a sidelink data transmission component 750 as described with reference to FIG. 7.

Figure 12:
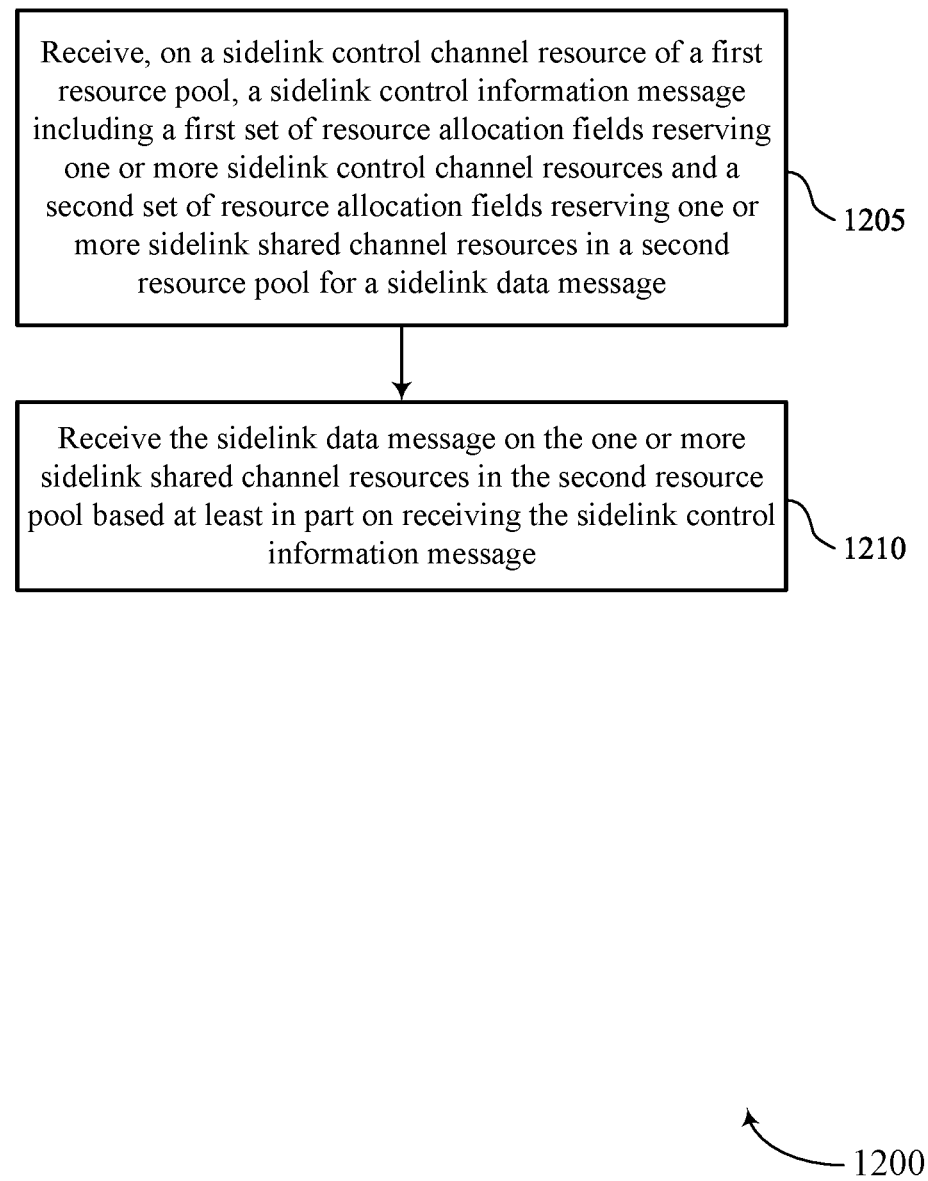

FIG. 12 shows a flowchart illustrating a method 1200 that supports techniques for sidelink joint channel sensing and resource selection in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include receiving, on a sidelink control channel resource of a first resource pool, an SCI message including a first set of resource allocation fields reserving one or more sidelink control channel resources and a second set of resource allocation fields reserving one or more sidelink shared channel resources in a second resource pool for a sidelink data message. The operations of 1205 may be performed in accordance with examples as disclosed herein. In some examples, aspects of the operations of 1205 may be performed by a control resource pool monitoring component 725 as described with reference to FIG. 7.

At 1210, the method may include receiving the sidelink data message on the one or more sidelink shared channel resources in the second resource pool based on receiving the SCI message. The operations of 1210 may be performed in accordance with examples as disclosed herein. In some examples, aspects of the operations of 1210 may be performed by a data resource pool monitoring component 735 as described with reference to FIG. 7.

The following provides an overview of aspects of the present disclosure:

Aspect 1: A method for wireless communications at a UE, comprising: monitoring, during a first sensing window, a first resource pool associated with sidelink control signaling; selecting one or more sidelink control channel resources from the first resource pool based at least in part on the monitoring during the first sensing window; monitoring, during a second sensing window, at least a portion of a second resource pool associated with sidelink data signaling; selecting one or more sidelink shared channel resources from the second resource pool based at least in part on the monitoring during the first sensing window and the monitoring during the second sensing window; transmitting, on a first sidelink control channel resource from the first resource pool, a first sidelink control information message reserving the selected one or more sidelink control channel resources from the first resource pool and reserving the selected one or more sidelink shared channel resources from the second resource pool for a sidelink data message; and transmitting the sidelink data message on the one or more reserved sidelink shared channel resources.

Aspect 2: The method of aspect 1, wherein transmitting the first sidelink control information message comprises: transmitting the first sidelink control information message including a first time domain resource allocation field and a first frequency domain resource allocation field indicating the one or more sidelink control channel resources and including a second time domain resource allocation field and a second frequency domain resource allocation field indicating the one or more sidelink shared channel resources.

Aspect 3: The method of any of aspects 1 through 2, wherein the selecting comprises: selecting the one or more sidelink control channel resources from the first resource pool according to a first resource selection window from the first sidelink control channel resource; and selecting the one or more sidelink shared channel resources from the second resource pool according to a second resource selection window from the first sidelink control channel resource.

Aspect 4: The method of aspect 3, wherein the first resource selection window is associated with a first starting time and a first duration, and the second resource selection window is associated with a second starting time and a second duration.

Aspect 5: The method of any of aspects 1 through 4, wherein transmitting the first sidelink control information message comprises: transmitting the first sidelink control information message on a subchannel that is mapped to a slot of the second resource pool, wherein the first sidelink control information message reserves a first sidelink shared channel resource of the one or more sidelink shared channel resources in the slot based at least in part on the subchannel being mapped.

Aspect 6: The method of aspect 5, further comprising: indicating, via a frequency domain resource allocation field of the first sidelink control information message, a subchannel of the slot of the second resource pool for the first sidelink shared channel resource.

Aspect 7: The method of any of aspects 1 through 6, wherein monitoring the first resource pool during the first sensing window comprises: detecting, on the first resource pool during the first sensing window, a second sidelink control information message reserving a second sidelink control channel resource and a second sidelink shared channel resource; selecting the one or more sidelink control channel resources which do not overlap with the second sidelink control channel resource; and selecting the one or more sidelink shared channel resources which do not overlap with the second sidelink shared channel resource.

Aspect 8: The method of any of aspects 1 through 7, wherein monitoring the second resource pool during the second sensing window comprises: detecting, on the second resource pool during the second sensing window, a second sidelink control information message reserving a second sidelink shared channel resource; and selecting the one or more sidelink shared channel resources which do not overlap with the second sidelink shared channel resource.

Aspect 9: The method of any of aspects 1 through 8, further comprising: transmitting a second sidelink control information message on the portion of the second resource pool that is at least partially overlapping a third resource pool, wherein the second sidelink control information message indicates the one or more sidelink shared channel resources in the portion of the second resource pool that is at least partially overlapping the third resource pool.

Aspect 10: The method of any of aspects 1 through 9, further comprising: estimating a first reference signal received power (RSRP) projection on the first resource pool based at least in part monitoring the first resource pool during the first sensing window, wherein the one or more sidelink control channel resources are selected based at least in part on the first RSRP projection; and estimating a second RSRP projection on the second resource pool based at least in part monitoring the first resource pool and monitoring the second resource pool, wherein the one or more sidelink shared channel resources are selected based at least in part on the second RSRP projection.

Aspect 11: The method of aspect 10, wherein the selecting comprises: selecting the one or more sidelink control channel resources based at least in part on the first RSRP projection for the one or more sidelink control channel resources satisfying a first threshold; and selecting the one or more sidelink shared channel resources based at least in part on the second RSRP projection for the one or more sidelink shared channel resources satisfying a second threshold.

Aspect 12: The method of aspect 11, wherein the one or more sidelink shared channel resources are offset in time from the one or more sidelink control channel resources by a configured number of slots.

Aspect 13: The method of aspect 12, wherein the configured number of slots is based at least in part on a capability of the UE.

Aspect 14: The method of any of aspects 11 through 13, wherein the first threshold is based at least in part on a first priority of signaling associated with the one or more sidelink control channel resources or a first resource candidate availability in the first resource pool, or both, and the second threshold is based at least in part on a second priority of signaling associated with the one or more sidelink shared channel resources or a second resource candidate availability in the second resource pool, or both.

Aspect 15: The method of any of aspects 11 through 14, wherein the one or more sidelink control channel resources are selected randomly.

Aspect 16: The method of any of aspects 11 through 15, wherein the one or more sidelink shared channel resources are selected based at least in part on channel state information for the second resource pool.

Aspect 17: The method of any of aspects 10 through 16, further comprising: selecting the one or more sidelink shared channel resources based at least in part on a highest RSRP projection from the first RSRP projection and the second RSRP projection.

Aspect 18: The method of any of aspects 10 through 17, further comprising: selecting the one or more sidelink shared channel resources based at least in part on a sum of the first RSRP projection and the second RSRP projection.

Aspect 19: The method of any of aspects 1 through 18, further comprising: determining the first sidelink control channel resource is available prior to transmission, wherein the first sidelink control information message is transmitted based at least in part the first sidelink control channel resource being available; and determining the one or more sidelink shared channel resources are available prior to transmission, wherein the sidelink data message is transmitted based at least in part the one or more sidelink shared channel resources being available.

Aspect 20: A method for wireless communications at a UE, comprising: receiving, on a sidelink control channel resource of a first resource pool, a sidelink control information message including a first set of resource allocation fields reserving one or more sidelink control channel resources and a second set of resource allocation fields reserving one or more sidelink shared channel resources in a second resource pool for a sidelink data message; and receiving the sidelink data message on the one or more sidelink shared channel resources in the second resource pool based at least in part on receiving the sidelink control information message.

Aspect 21: The method of aspect 20, wherein receiving the sidelink control information message comprises: receiving the sidelink control information message including a first time domain resource allocation field and a first frequency domain resource allocation field indicating the one or more sidelink control channel resources and including a second time domain resource allocation field and a second frequency domain resource allocation field indicating the one or more sidelink shared channel resources.

Aspect 22: The method of any of aspects 20 through 21, further comprising: monitoring the one or more sidelink control channel resources in the first resource pool for a retransmission of the sidelink control information message based at least in part on the first set of resource allocation fields.

Aspect 23: An apparatus for wireless communications at a UE, comprising a processor; memory coupled with the processor; and instructions stored in the memory and executable by the processor to cause the apparatus to perform a method of any of aspects 1 through 19.

Aspect 24: An apparatus for wireless communications at a UE, comprising at least one means for performing a method of any of aspects 1 through 19.

Aspect 25: A non-transitory computer-readable medium storing code for wireless communications at a UE, the code comprising instructions executable by a processor to perform a method of any of aspects 1 through 19.

Aspect 26: An apparatus for wireless communications at a UE, comprising a processor; memory coupled with the processor; and instructions stored in the memory and executable by the processor to cause the apparatus to perform a method of any of aspects 20 through 22.

Aspect 27: An apparatus for wireless communications at a UE, comprising at least one means for performing a method of any of aspects 20 through 22.

Aspect 28: A non-transitory computer-readable medium storing code for wireless communications at a UE, the code comprising instructions executable by a processor to perform a method of any of aspects 20 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
monitoring, during a first sensing window, a first resource pool associated with sidelink control signaling;
selecting one or more sidelink control channel resources from the first resource pool based at least in part on the monitoring during the first sensing window, wherein each subchannel of the first resource pool associated with sidelink control signaling maps to a respective slot of a second resource pool associated with sidelink data signaling;
monitoring, during a second sensing window, at least a portion of the second resource pool associated with sidelink data signaling;
selecting one or more sidelink shared channel resources from the second resource pool based at least in part on the monitoring during the first sensing window the monitoring during the second sensing window, and each subchannel of the first resource pool mapping to the respective slot of the second resource pool;

transmitting, using a first sidelink control channel resource on a first subchannel of the first resource pool, a first sidelink control information message reserving the selected one or more sidelink control channel resources from the first resource pool and reserving the selected one or more sidelink shared channel resources from the second resource pool for a sidelink data message; and transmitting the sidelink data message on the one or more reserved sidelink shared channel resources during a slot that maps to the first subchannel of the first resource pool.

2. The method of claim 1, wherein transmitting the first sidelink control information message comprises:
transmitting the first sidelink control information message including a first time domain resource allocation field and a first frequency domain resource allocation field indicating the one or more sidelink control channel resources and including a second time domain resource allocation field and a second frequency domain resource allocation field indicating the one or more sidelink shared channel resources.

3. The method of claim 1, wherein the selecting comprises:
selecting the one or more sidelink control channel resources from the first resource pool according to a first resource selection window from the first sidelink control channel resource; and
selecting the one or more sidelink shared channel resources from the second resource pool according to a second resource selection window from the first sidelink control channel resource.

4. The method of claim 3, wherein the first resource selection window is associated with a first starting time and a first duration, and the second resource selection window is associated with a second starting time and a second duration.

5. The method of claim 1, wherein the first sidelink control information message reserves a first sidelink shared channel resource of the one or more sidelink shared channel resources in the slot based at least in part on the first subchannel mapping to the slot.

6. The method of claim 5, further comprising:
indicating, via a frequency domain resource allocation field of the first sidelink control information message, a second subchannel of the second resource pool during the slot for the first sidelink shared channel resource.

7. The method of claim 1, wherein monitoring the first resource pool during the first sensing window comprises:
detecting, on the first resource pool during the first sensing window, a second sidelink control information message reserving a second sidelink control channel resource and a second sidelink shared channel resource;
selecting the one or more sidelink control channel resources which do not overlap with the second sidelink control channel resource; and
selecting the one or more sidelink shared channel resources which do not overlap with the second sidelink shared channel resource.

8. The method of claim 1, wherein monitoring the second resource pool during the second sensing window comprises:
detecting, on the second resource pool during the second sensing window, a second sidelink control information message reserving a second sidelink shared channel resource; and
selecting the one or more sidelink shared channel resources which do not overlap with the second sidelink shared channel resource.

9. The method of claim 1, further comprising:
transmitting a second sidelink control information message on the portion of the second resource pool that is at least partially overlapping a third resource pool, wherein the second sidelink control information message indicates the one or more sidelink shared channel resources in the portion of the second resource pool that is at least partially overlapping the third resource pool.

10. The method of claim 1, further comprising:
estimating a first reference signal received power (RSRP) projection on the first resource pool based at least in part on monitoring the first resource pool during the first sensing window, wherein the one or more sidelink control channel resources are selected based at least in part on the first RSRP projection; and
estimating a second RSRP projection on the second resource pool based at least in part on monitoring the first resource pool and monitoring the second resource pool, wherein the one or more sidelink shared channel resources are selected based at least in part on the second RSRP projection.

11. The method of claim 10, wherein the selecting comprises:
selecting the one or more sidelink control channel resources based at least in part on the first RSRP projection for the one or more sidelink control channel resources satisfying a first threshold; and
selecting the one or more sidelink shared channel resources based at least in part on the second RSRP projection for the one or more sidelink shared channel resources satisfying a second threshold.

12. The method of claim 11, wherein the one or more sidelink shared channel resources are offset in time from the one or more sidelink control channel resources by a configured number of slots.

13. The method of claim 12, wherein the configured number of slots is based at least in part on a capability of the UE.

14. The method of claim 11, wherein the first threshold is based at least in part on a first priority of signaling associated with the one or more sidelink control channel resources or a first resource candidate availability in the first resource pool, or both, and the second threshold is based at least in part on a second priority of signaling associated with the one or more sidelink shared channel resources or a second resource candidate availability in the second resource pool, or both.

15. The method of claim 11, wherein the one or more sidelink control channel resources are selected randomly.

16. The method of claim 11, wherein the one or more sidelink shared channel resources are selected based at least in part on channel state information for the second resource pool.

17. The method of claim 10, further comprising:
selecting the one or more sidelink shared channel resources based at least in part on a highest RSRP projection from the first RSRP projection and the second RSRP projection.

18. The method of claim 10, further comprising:
selecting the one or more sidelink shared channel resources based at least in part on a sum of the first RSRP projection and the second RSRP projection.

19. The method of claim 1, further comprising:
determining the first sidelink control channel resource is available prior to transmission, wherein the first sidelink control information message is transmitted based at least in part on the first sidelink control channel resource being available; and determining the one or more sidelink shared channel resources are available prior to transmission, wherein the sidelink data message is transmitted based at least in part on the one or more sidelink shared channel resources being available.

20. A method for wireless communications at a user equipment (UE), comprising:

receiving, over a sidelink control channel resource on a first subchannel of a first resource pool associated with sidelink control signaling, a sidelink control information message including a first set of resource allocation fields reserving one or more sidelink control channel resources and a second set of resource allocation fields reserving one or more sidelink shared channel resources in a second resource pool for a sidelink data message, wherein each subchannel of the first resource pool associated with sidelink control signaling maps to a respective slot of the second resource pool associated with sidelink data signaling; and receiving the sidelink data message over the one or more sidelink shared channel resources in the second resource pool during a slot that maps to the first subchannel based at least in part on receiving the sidelink control information message.

21. The method of claim 20, wherein receiving the sidelink control information message comprises:

receiving the sidelink control information message including a first time domain resource allocation field and a first frequency domain resource allocation field indicating the one or more sidelink control channel resources and including a second time domain resource allocation field and a second frequency domain resource allocation field indicating the one or more sidelink shared channel resources.

22. The method of claim 20, further comprising:

monitoring the one or more sidelink control channel resources in the first resource pool for a retransmission of the sidelink control information message based at least in part on the first set of resource allocation fields.

23. An apparatus for wireless communications at a user equipment (UE), comprising:

one or more processors;

one or more memories coupled with the one or more processors; and instructions stored in the one or more memories and executable by the one or more processors to cause the apparatus to:

monitor, during a first sensing window, a first resource pool associated with sidelink control signaling;

select one or more sidelink control channel resources from the first resource pool based at least in part on the monitoring during the first sensing window, wherein each subchannel of the first resource pool associated with sidelink control signaling maps to a respective slot of a second resource pool associated with sidelink data signaling;

monitor, during a second sensing window, at least a portion of the second resource pool associated with sidelink data signaling;

select one or more sidelink shared channel resources from the second resource pool based at least in part on the monitoring during the first sensing window, the monitoring during the second sensing window, and each subchannel of the first resource pool mapping to the respective slot of the second resource pool;

transmit, using a first sidelink control channel resource on a first subchannel of the first resource pool, a first sidelink control information message reserving the selected one or more sidelink control channel resources from the first resource pool and reserving the selected one or more sidelink shared channel resources from the second resource pool for a sidelink data message; and transmit the sidelink data message on the one or more reserved sidelink shared channel resources during a slot that maps to the first subchannel of the first resource pool.

24. The apparatus of claim 23, wherein the instructions to transmit the first sidelink control information message are executable by the one or more processors to:

transmit the first sidelink control information message including a first time domain resource allocation field and a first frequency domain resource allocation field indicating the one or more sidelink control channel resources and including a second time domain resource allocation field and a second frequency domain resource allocation field indicating the one or more sidelink shared channel resources.

25. The apparatus of claim 23, wherein the instructions to select are executable by the one or more processors to:

select the one or more sidelink control channel resources from the first resource pool according to a first resource selection window from the first sidelink control channel resource; and select the one or more sidelink shared channel resources from the second resource pool according to a second resource selection window from the first sidelink control channel resource.

26. The apparatus of claim 23, wherein the instructions to monitor the first resource pool during the first sensing window are executable by the one or more processors to:

detect, on the first resource pool during the first sensing window, a second sidelink control information message reserving a second sidelink control channel resource and a second sidelink shared channel resource;

select the one or more sidelink control channel resources which do not overlap with the second sidelink control channel resource; and select the one or more sidelink shared channel resources which do not overlap with the second sidelink shared channel resource.

27. The apparatus of claim 23, wherein the instructions to monitor the second resource pool during the second sensing window are executable by the one or more processors to:

detect, on the second resource pool during the second sensing window, a second sidelink control information message reserving a second sidelink shared channel resource; and select the one or more sidelink shared channel resources which do not overlap with the second sidelink shared channel resource.

28. The apparatus of claim 23, wherein the instructions are further executable by the one or more processors to cause the apparatus to:

estimate a first reference signal received power (RSRP) projection on the first resource pool based at least in part on monitoring the first resource pool during the first sensing window, wherein the one or more sidelink control channel resources are selected based at least in part on the first RSRP projection; and estimate a second RSRP projection on the second resource pool based at least in part on monitoring the first resource pool and monitoring the second resource pool, wherein the one or more sidelink shared channel resources are selected based at least in part on the second RSRP projection.

29. The apparatus of claim 23, wherein the instructions are further executable by the one or more processors to cause the apparatus to:
  determine the first sidelink control channel resource is available prior to transmission, wherein the first sidelink control information message is transmitted based at least in part on the first sidelink control channel resource being available; and
  determine the one or more sidelink shared channel resources are available prior to transmission, wherein the sidelink data message is transmitted based at least in part on the one or more sidelink shared channel resources being available.

30. An apparatus for wireless communications at a user equipment (UE), comprising:
  one or more processors;
  one or more memories coupled with the one or more processors; and
  instructions stored in the one or more memories and executable by the one or more processors to cause the apparatus to:
    receive, over a sidelink control channel resource on a first subchannel of a first resource pool associated with sidelink control signaling, a sidelink control information message including a first set of resource allocation fields reserving one or more sidelink control channel resources and a second set of resource allocation fields reserving one or more sidelink shared channel resources in a second resource pool for a sidelink data message, wherein each subchannel of the first resource pool associated with sidelink control signaling maps to a respective slot of the second resource pool for sidelink data signaling; and
    receive the sidelink data message over the one or more sidelink shared channel resources in the second resource pool during a slot that maps to the first subchannel based at least in part on receiving the sidelink control information message.

\* \* \* \* \*